United States Patent [19]

Kimura et al.

[11] Patent Number: 5,815,477
[45] Date of Patent: Sep. 29, 1998

[54] WRITE TEST METHOD FOR USE IN RECORDING PROCESS FOR RECORDING INFORMATION BY MODULATING THE POWER OF A LASER LIGHT THEREBY FORMING A HIGH-TEMPERATURE STATE AND A LOW-TEMPERATURE STATE ON A RECORDING MEDIUM

[75] Inventors: Shunpei Kimura; Takaaki Ashinuma, both of Yokohama; Tsutomu Shiratori, Tokyo; Akira Miyashita, Tokorozawa, all of Japan

[73] Assignee: Canon Kabushiki Kaisha, Tokyo, Japan

[21] Appl. No.: 594,300

[22] Filed: Jan. 30, 1996

[30] Foreign Application Priority Data

| Jan. 31, 1995 | [JP] | Japan | 7-014099 |
| Jul. 19, 1995 | [JP] | Japan | 7-182613 |
| Jul. 19, 1995 | [JP] | Japan | 7-182614 |

[51] Int. Cl.$^6$ .................................................. G11B 7/00
[52] U.S. Cl. ............................. 369/50; 369/54; 369/116
[58] Field of Search ........................... 369/50, 54, 116

[56] References Cited

U.S. PATENT DOCUMENTS

| 4,918,677 | 4/1990 | Ashinuma et al. | 369/32 |
| 5,132,945 | 7/1992 | Osato et al. | 369/13 |
| 5,345,434 | 9/1994 | Ide et al. | 369/54 X |

FOREIGN PATENT DOCUMENTS

| 63-239637 | 10/1988 | Japan . |
| 1-204240 | 8/1989 | Japan . |
| 5-274738 | 10/1993 | Japan . |
| 5-290437 | 11/1993 | Japan . |
| 6-195713 | 7/1994 | Japan . |
| 6-208740 | 7/1994 | Japan . |

OTHER PUBLICATIONS

Patent Abstracts of Japan, vol. 18, No. 57, published Jan. 28, 1994, English Abstract of Japanese Patent No. 5-274738.
Patent Abstracts of Japan, vol. 13, No. 505, published Nov. 14, 1989, English Abstract of Japanese Patent No. 1-204240.
Patent Abstracts of Japan, vol. 18, No. 574, published Nov. 2, 1994, English Abstract of Japanese Patent No. 6-208740.
Patent Abstracts of Japan, vol. 18, No. 89, published Feb. 14, 1994, English Abstract of Japanese Patent No. 5-290437.
Patent Abstracts of Japan, vol. 18, No. 552, published Oct. 20, 1994, English Abstract of Japanese Patent No. 6-195713.

*Primary Examiner*—W. R. Young
*Attorney, Agent, or Firm*—Fitzpatrick, Cella, Harper & Scinto

[57] ABSTRACT

A write test method for use in a recording process for recording information is effected by such that the power of a laser light is modulated to form a high-temperature state and a low-temperature state on a recording medium. First, a predetermined signal is recorded on the recording medium while varying the power level of the laser light. The information recorded on the recording medium is reproduced to detect the power level of the laser light, immediately before formation of the high-temperature state, based on the amplitude of a reproduced signal. The power levels of the laser light for forming the low-temperature state and for forming the high-temperature state are determined on the basis of the detected power level.

6 Claims, 26 Drawing Sheets

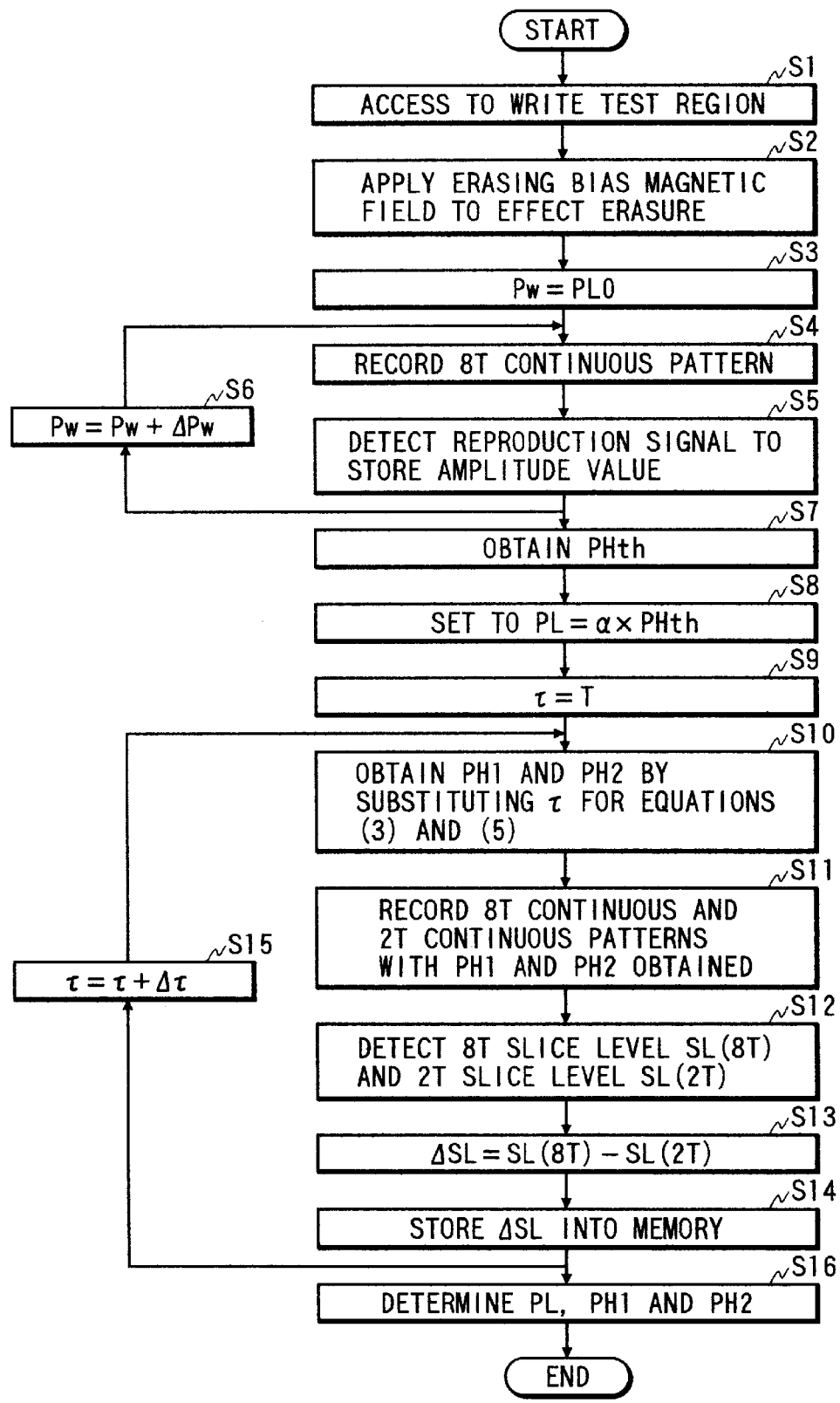

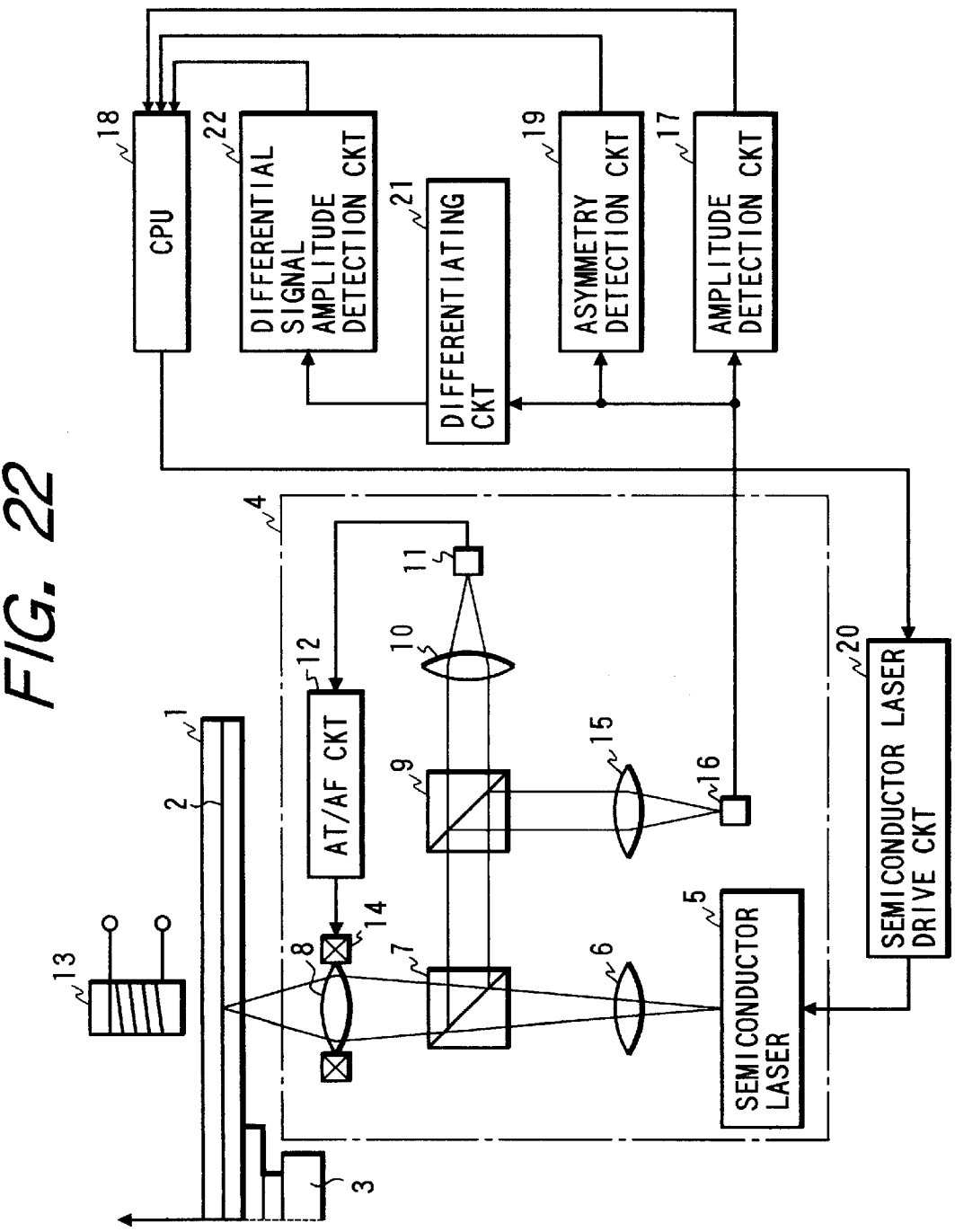

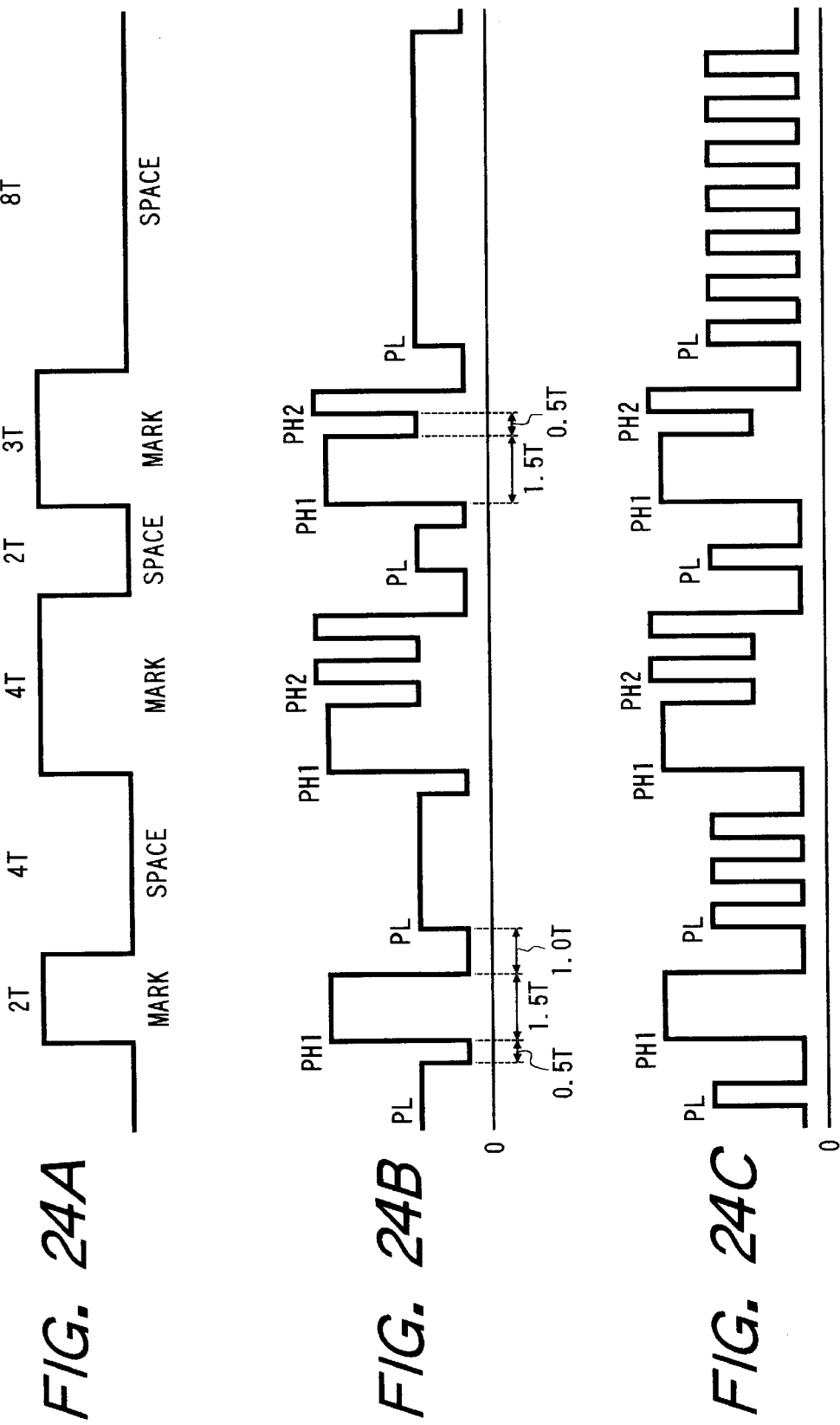

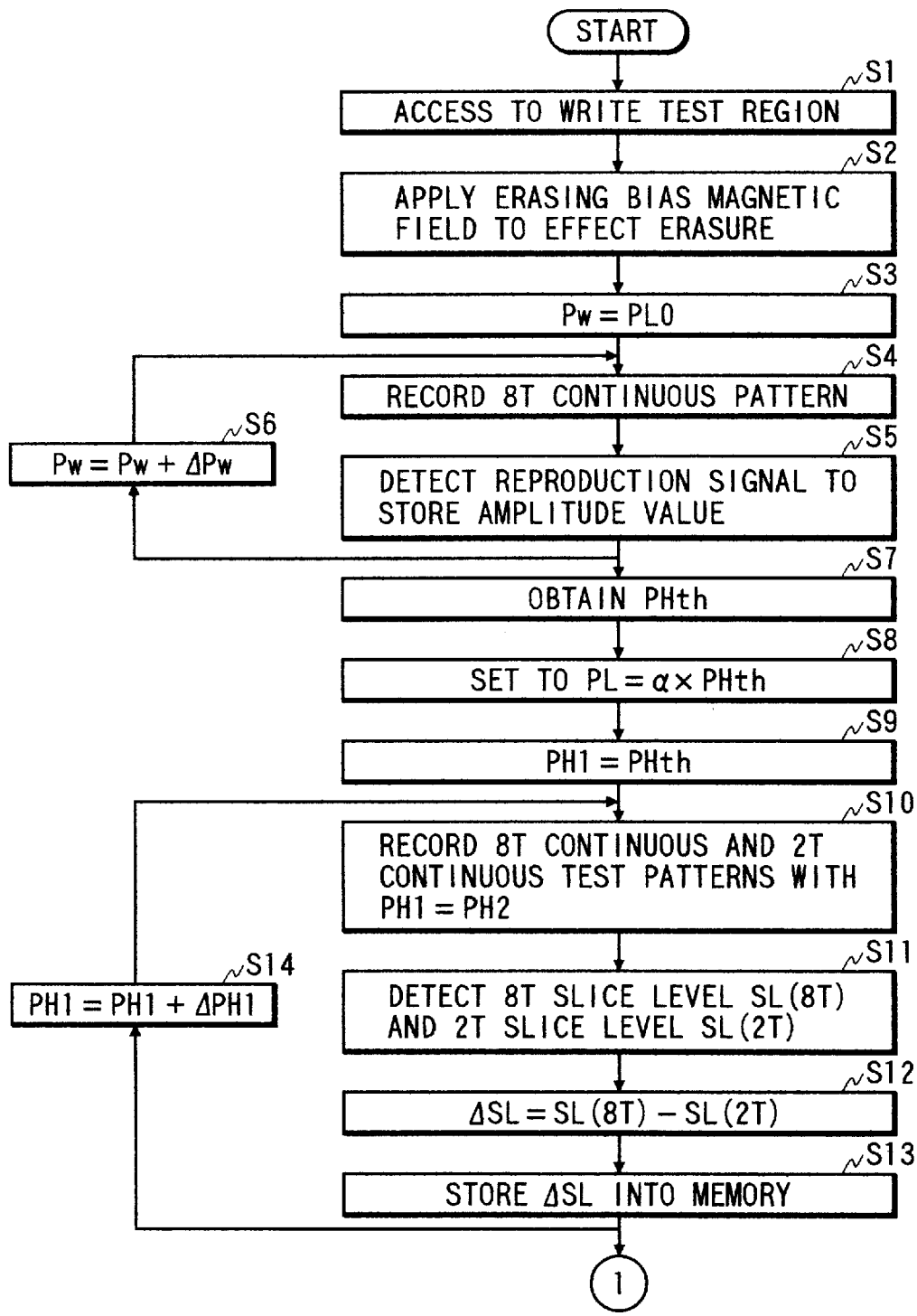

WRITE TEST METHOD FOR USE IN RECORDING PROCESS FOR RECORDING INFORMATION BY MODULATING THE POWER OF A LASER LIGHT THEREBY FORMING A HIGH-TEMPERATURE STATE AND A LOW-TEMPERATURE STATE ON A RECORDING MEDIUM

BACKGROUND OF THE INVENTION

1. Field of the Invention

The present invention relates to a write test method suitable for a pit edge recording method, and also to an optical information recording/reproducing apparatus utilizing the above-mentioned write test method.

2. Related Background Art

Among the apparatus for recording or reproducing information by irradiating an information recording medium with a light beam, there have been known, for example, an exclusive reproducing apparatus for the reproduction of information from a recording medium exclusive for reproduction, on which information is recorded in advance, a write-once-read-many type apparatus for recording an information bit by forming an aperture in a recording film with heat, an apparatus for varying the crystalline state of a medium and recording information by the difference in the reflectivity, and a re-writable apparatus for recording an information bit by varying the direction of magnetization of a vertical magnetization film.

Among such apparatus, FIG. 1 shows the configuration of a re-writable magnetooptical disk apparatus utilizing a light modulation overwrite method. In FIG. 1, a magnetooptical disk 1, constituting an information recording medium, bears a magnetic film 2 on a transparent substrate composed, for example, of glass or plastics. The magnetooptical disk 1 is mounted on the rotary shaft of a spindle motor 3 and is rotated thereby at a predetermined speed. An optical head 4 is positioned below the magnetooptical disk 1, and a bias magnet 13 is provided thereabove, in opposed relationship to the optical head 4. Inside the optical head 4 a semiconductor laser 5 is provided as a light source for reproducing the recorded information, and a light beam emitted therefrom is converted into a parallel light beam by a collimating lens 6 and enters an objective lens 8 through a polarizing beam splitter 7. The light beam thus introduced is condensed by the objective lens 8 into a small light spot onto the magnetic film 2 of the magnetooptical disk 1. In case of information recording, the light beam from the semiconductor laser 5 is modulated according to the information signal and irradiates an information track on the magnetooptical disk 1. At the same time, a magnetic field of a fixed direction is applied by the bias magnet 13 to the magnetooptical disk 1, and the information is serially recorded by the cooperation of the magnetic field application and the modulated light beam irradiation.

On the other hand, the light beam irradiating the magnetooptical disk 1 is reflected by the surface thereof. Thus reflected light enters the polarizing beam splitter 7 again through the objective lens 8, and is reflected by the polarizing plane of the beam splitter 7 toward a beam splitter 9, thereby being separated from the incident light from the semiconductor laser 5. In the beam splitter 9, the entering light bean is split into two light beams, one of which is received by a photosensor 11 through a sensor lens 10. The signal therefrom is supplied to an AT•AF (auto-tracking/auto-focusing control) circuit 12, which in response, generates a tracking error signal and a focus error signal. Based on these signals, an objective lens actuator 14 is driven to displace the objective lens 8 in the tracking direction and in the focusing direction, thereby achieving tracking control and focus control.

On the other hand, in the case of reproducing the information recorded on the magnetooptical disk 1, the light beam from the semiconductor laser 5 is set at a reproducing power of a level incapable of recording, and the recorded information is reproduced by scanning the desired track with such reproducing light beam. The reproducing light beam, reflected from the disk surface, travels through the objective lens 8, the polarizing beam splitter 7, the beam splitter 9 and a sensor lens 15 and is received by a photosensor 16. The signal therefrom is supplied to an unrepresented signal processing circuit for predetermined signal processing, whereby the recorded information is reproduced. Also at the reproduction of information, the reflected light of the reproducing light beam is received by the photosensor 11, and, based on the signal therefrom, the AT•AF circuit 12 effects tracking control and focus control.

In the following there will be explained the recording process of the light modulation overwrite method in the apparatus shown in FIG. 1. This light modulation overwrite method is described in detail, for example, in the Japanese Patent Laid-open Application No. 3-239637. The magnetic film 2 of the magnetooptical disk 1 is composed of a first magnetic layer and a second magnetic layer, which are exchange coupled. The coercive force of the first magnetic layer at room temperature is selected to be larger than that of the second magnetic layer, and the Curie temperature of the first magnetic layer is selected to be lower than that of the second magnetic layer. In the case of information recording on the disk 1, the second magnetic layer of the higher Curie temperature is at first initialized in a direction, and overwriting is achieved by intensity modulation of the laser beam from the optical head 4. The laser beam has mutually different first and second laser powers. The first laser power level PL for heating the disk 1 to the Curie temperature of the first magnetic layer (to form a lower temperature level state), while the second laser power level PH is for heating the disk 1 to the Curie temperature of the second magnetic layer (to form a higher temperature level state).

More specifically, the laser beam is modulated between two power levels according to the information. Under the irradiation with the first laser power PL, the magnetization disappears only in the first magnetic layer with the lower Curie temperature, and the magnetization appearing in the irradiated area in the succeeding cooling process is oriented in a stable direction with respect to the initialized second magnetic layer of the higher Curie temperature, by the exchange coupling therewith. Under the irradiation with the second laser power PH, the magnetization in the irradiation area disappears in the first and second magnetic layers, and the magnetization of the second magnetic layer, appearing in the succeeding cooling process, is oriented in the direction of the bias magnetic field. Also, the magnetization of the first magnetic layer is oriented in a stable direction with respect to the magnetization of the second magnetic layer, by the exchange coupling therewith, whereby information recording is achieved. In this manner, by selecting the first and second laser powers according to information, the recording thereof can be attained by orienting the magnetization of the first magnetic layer in the direction of initialization under the first laser power and in the direction of the bias magnetic field under the second laser power. In such a recording operation with two such laser levels, overwriting is made possible, regardless of the magnetization state of the first magnetic layer prior to the recording operation.

The magnetooptical disk apparatus shown in FIG. 1 employs the light modulation overwriting method as explained above, and is capable of information recording without erasure of the prior information. Also in recent years, there has been principally employed so-called bit edge recording, giving information to both edges of each recorded bit, for increasing the information density. For such high-speed and high-density information recording, it is necessary to record each information bit in an accurate and stable manner, but the recording powers are subject to fluctuation due to the variation in the temperature in the apparatus or a smear on the objective lens or the disk. For this reason, in the conventional technology, the recorded bit varies according to the variation of the recording powers, and is incapable of sufficiently achieving high-speed or high-density recording.

SUMMARY OF THE INVENTION

In consideration of the foregoing, the object of the present invention is to provide a write test method enabling exact recording of a recorded bit irrespective of a variation in the temperature within the apparatus or of a smear on the objective lens or the recording medium, and an optical information recording/reproducing apparatus utilizing such a write test method.

The foregoing object can be attained, according to the present invention, by a write test method in an information recording method by modulating the power of a laser light, thereby forming high- and low-temperature states on a recording medium, comprising steps of:

recording a predetermined signal on the medium by varying the power level of the laser light;

reproducing the recorded information;

detecting the power level of the laser light immediately before the formation of the high-temperature state, based on the amplitude of the reproduced signal obtained in the reproducing step; and determining the power levels of the laser light for forming the low- and high-temperature states, based on the thus detected power level.

Also, the foregoing object can be attained, according to the present invention, by an optical information recording/reproducing apparatus capable of information recording by forming high- and low-temperature states on a recording medium by modulating the power of a laser light, comprising:

a laser light source for emitting a laser light;

means for modulating the power level of the laser light according to information to be recorded;

means for reproducing the recorded information by detecting the light reflected from the medium; and means for recording a predetermined signal on the medium by varying the power level of the laser light by the modulating means, then reproducing the thus recorded information by the reproducing means and detecting the power level of the laser light immediately before the formation of the high-temperature state, based on the amplitude of the reproduced signal, and determining the power levels of the laser light for forming the low- and high-temperature states, based on the thus detected power level.

The foregoing and other objects of the present invention, and the features thereof, will become fully apparent from the following description of the embodiments.

BRIEF DESCRIPTION OF THE DRAWINGS

FIG. 16 is a flow chart of the second embodiment of the write test method of the present invention;

FIG. 22 is a view showing the configuration of a third embodiment of the optical information recording/reproducing apparatus of the present invention;

FIGS. 24A to 24C are charts showing a recorded pattern and corresponding laser turn-on wave forms in the third embodiment;

FIGS. 25 and 26 are flow charts showing the third embodiment of the write test method of the present invention;

DETAILED DESCRIPTION OF THE PREFERRED EMBODIMENTS

[First Embodiment]

Figure 1:
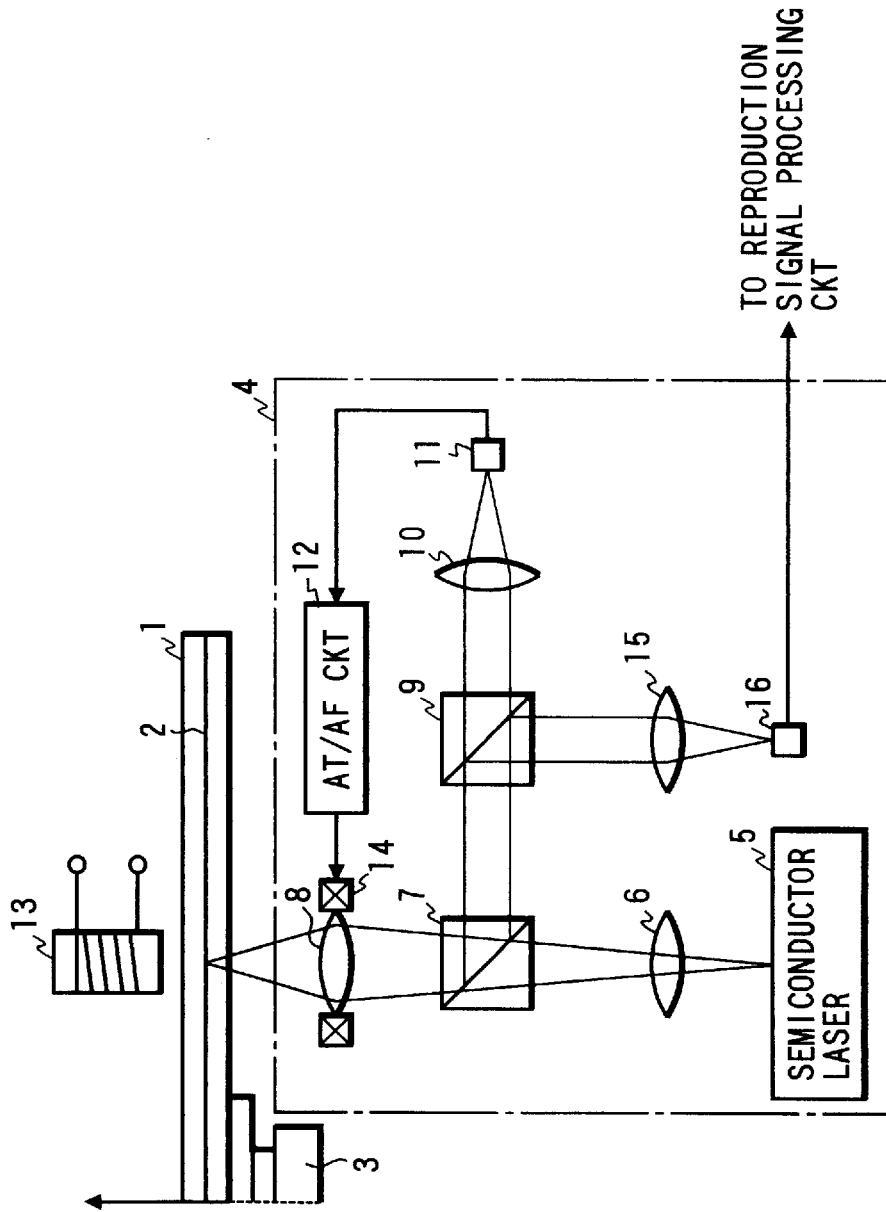
FIG. 1 is a schematic view of a conventional magnetooptical disk apparatus.
Figure 2:
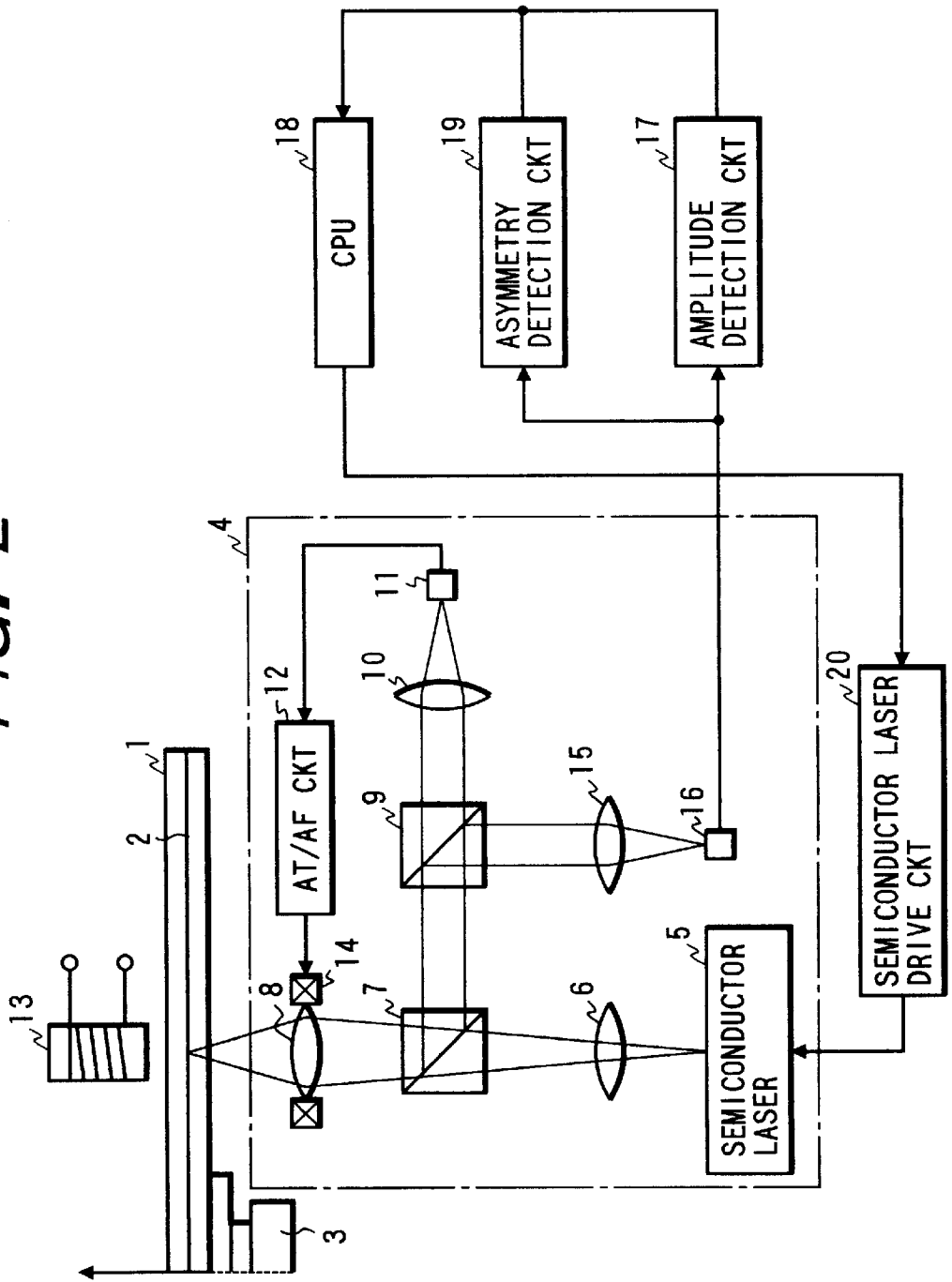
FIG. 2 is a view showing the configuration of an embodiment of the optical information recording/reproducing apparatus of the present invention.

Now the present invention will be clarified in detail by preferred embodiments thereof shown in the attached drawings. FIG. 2 is a view showing the configuration of an embodiment of the optical information recording/reproducing apparatus of the present invention, wherein components the same as those in the conventional apparatus shown in FIG. 1 are represented by same numerals and will not be explained further. More specifically, the magnetooptical disk 1, the magnetic film 2, the spindle motor 3 and the AT•AF circuit 12 in FIG. 2 are the same as those in FIG. 1. Also, the optical head 4 is composed of the semiconductor laser 5, the collimating lens 6, the objective lens 8, the polarizing beam splitters 7, 9, the sensor lenses 10, 15, the photosensors 11, 16 and the objective lens actuator 14 in the same manner as in the optical head 4 in FIG. 1. The optical head 4 is rendered movable, by an unrepresented mechanism, in the radial direction of the magnetooptical disk 1, for access to a desired information track thereof.

In the present embodiment, for detecting the amplitude of the reproduced signal obtained in the photosensor 16, there is provided an amplitude detection circuit 17, which serves to detect the amplitude of the reproduced signal, and detects the power PHth immediately before the start of a high-temperature process of the magnetooptical disk 1, prior to the write test as will be explained later in more detail. The amplitude of the reproduced signal is fetched in a CPU 18, through an A/D converter therein. An asymmetry detection circuit 19 serves to detect the asymmetry in the reproduced signals of two recording bits of different lengths, at the write test as will be explained later. Inside the asymmetry detection circuit 19 there is provided an automatic slice level tracing circuit for detecting the peak and bottom values of the reproduced signal and taking the middle value thereof always as the slice level. It detects the middle values (slice levels) of the reproduced signals of pre-determined long and short marks and releases the difference of these middle values as the asymmetry. The output of the asymmetry detection circuit 19 is also fetched by the A/D converter into the CPU 18.

The CPU 18 is a processor constituting the main control unit of the present optical information recording/reproducing apparatus, and serves to control the information recording and reproducing operations by controlling the AT•AF circuit 12, a drive circuit (not shown) for the bias magnet 13, a drive circuit (not shown) for the spindle motor 3, a drive circuit 20 for the semiconductor laser 5. Also, when the magnetooptical disk 1 is exchanged, the CPU 18 effects a write test by controlling various units, thereby setting the recording power of the semiconductor laser 5 at an optimum level, as will be explained later in more detail.

Figure 3:
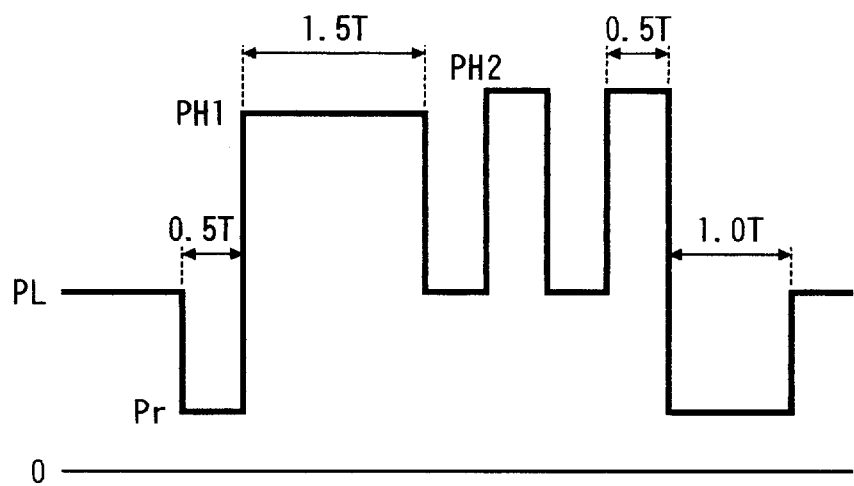
FIG. 3 is a chart showing a laser turn-on wave form for recording a 4 T pattern in a first embodiment.

FIG. 3 is a chart showing the turn-on wave form of the semiconductor laser 5 of the present invention, as an example, in case of recording a 4 T pattern. Referring to FIG. 3, PL indicates a power level for forming a low-temperature level state (for erasure) in the recording layer of the magnetooptical disk, while PH1 and PH2 are power levels for forming a high-temperature level state (for recording), a Pr is a constant reproducing power level. In the present embodiment, the recording power of the semiconductor laser 5 is controlled at four levels of PL, PH1, PH2 and Pr, and the values of PL, PH1 and PH2 are set at optimum levels by the write test.

The write test method of the present embodiment will be explained in detail with reference to FIGS. 4, 5 and 6. The write test of the present embodiment consists principally of the following three steps:

(1) The laser power PHth immediately before the formation of the high-temperature level state is determined for determining the laser power level PL for forming the low-temperature level state;

(2) The ratio of the laser power levels PH1 and PH2 for forming the high-temperature level state is determined; and (3) The absolute values of PH1 and PH2 are determined by varying the recording power, while maintaining a constant ratio between PH1 and PH2.

At first there will be explained the step (1) for determining the laser power level PL. Referring to FIG. 4, in case of the write test, the CPU 18 instructs the device to move the optical head 4 to a predetermined write test area of the magnetooptical disk 1 (S1). Then the CPU 18 controls the drive circuit for the bias magnet 13 and the semiconductor laser driving circuit 20, thereby applying an erasing bias magnetic field to the write test area and scanning the write test area with an erasing light beam to erase the write test area (S2). After the erasure, the CPU 18 sets an initial value Pw for the recording power of the semiconductor laser 5, for example by taking PL recorded in a control track of the magnetooptical disk 1.

After the setting of the initial value of the recording power, the CPU 18 instructs the device to record an 8 T continuous pattern in the write test area with the power of such initial value (S4), and subsequently reproduces the thus recorded 8 T continuous pattern for detecting the amplitude level of the reproduced signal (S5), by means of the amplitude detection circuit 17. The obtained amplitude level is fetched into the CPU 18 by the A/D converter therein, and is stored in an internal memory (S5). After the recording and reproduction with the initial value, the CPU 18 instructs the device to increase the recording power by adding ΔPw to the recording power Pw (S6), then records the 8 T continuous pattern with the thus increased recording power in the write test area (S4), reproduces the recorded signal and detects and stores the amplitude level of the reproduced signal (S5).

Figure 7:
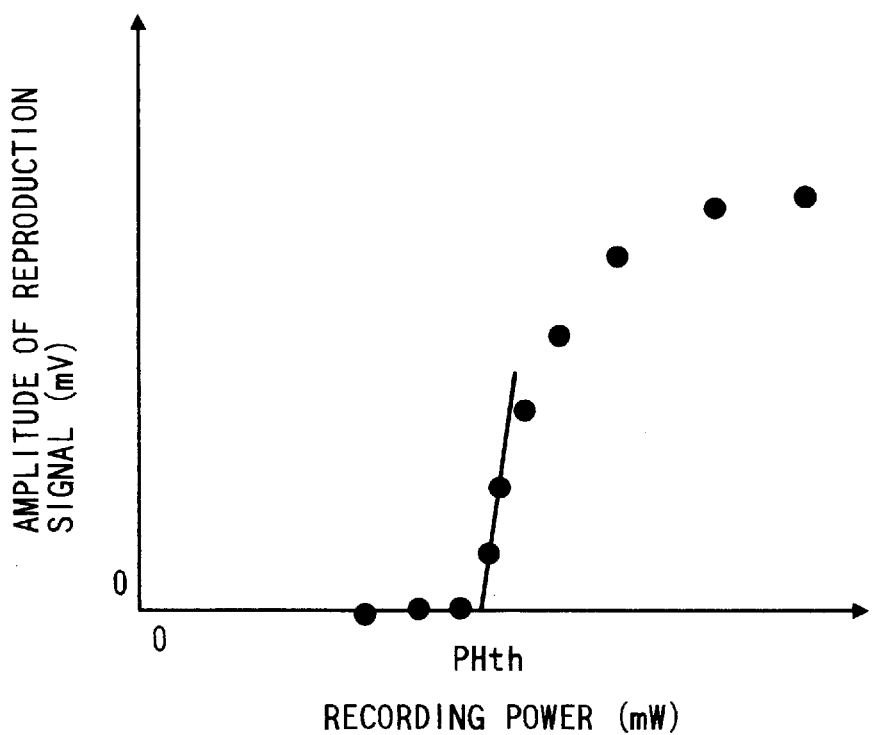
FIG. 7 is a chart showing the method for determining a laser power PHth immediately before the start of a high-temperature level state.

By repeating the steps S4 to S6 with stepwise increases of the recording power to a predetermined recording power level, there can be determined the relationship between the recording power and the amplitude of the reproduced signals shown in FIG. 7. The predetermined recording power can be, for example, twice the PH with which recording is effected on the control track of the magnetooptical disk. As shown in FIG. 7, the amplitude of the reproduced signal remains almost zero while the recording power is low, and rises steeply from a certain recording power, which corresponds to the desired laser power PHth immediately before the formation of the high-temperature level state.

The above-mentioned PHth immediately before the formation of the high-temperature level state, shown in FIG. 7, varies according to the temperature, depending on the characteristics of the medium. The present invention is based on this property and determines PL, PH1 and PH2 based on PHth, thereby setting the recording power corresponding to the variation in temperature. The CPU 18 determines the PHth from the data of the recording power and the reproduced signal amplitude stored in the memory and stores PHth in the memory (S7). In this manner the step (1) for determining PHth is completed. The present embodiment employs (1–7) codes for the modulation of the recorded information, and the longest bit 8 T in this code system is used for the detection of the reproduced signal amplitude.

In the following there will be explained the step (2) for determining the ratio of the laser power levels PH1 and PH2 for forming the high-temperature level state, with reference to FIG. 4. At first the CPU 18 instructs the device to set the laser power level PL for forming the low-temperature level state as PL=α×PHth (S8), utilizing the value of PHth determined in advance, wherein a is defined by PLmin/PHth<α<1.0. In this manner the value PL is determined. Then the CPU 18 instructs the device to set the laser power level PH1 for forming the high-temperature level state as PH1=PHth (S9), and records an 8 T-continuous/2 T-continuous pattern in the write test area of the magnetooptical disk 1 under a condition PH1=PH2 (S10). Thus, the recording conditions in this state are PL=α×PHth and PH1=PH2 =PHth, wherein PL is the value obtained previously.

After the recording of the 8 T-continuous/2 T-continuous pattern, the CPU 18 instructs the device to reproduce this pattern by controlling various units and detects the slice level SL(8 T) of the reproduced signal of the 8 T pattern and the SL(2 T) of the reproduced signal of the 2 T pattern (S11). More specifically, the asymmetry detection circuit 19 detects the middle values of the peak and bottom values of the reproduced signals of the 8 T continuous pattern and the 2 T continuous pattern, then detects the difference ΔSL between the slice level SL(8 T) of the reproduced signal of the 8 T continuous pattern and the SL(2 T) of the reproduced signal of the 2 T continuous pattern (S12), and the CPU 18 discriminates whether ΔSL is 0 (S13). If not, the CPU 18 adds ΔPH1 to PH1 and again effects recording of the 8 T-continuous/2 T-continuous pattern in the write test area (S10), similarly reproducing the recorded signal and detecting the 8 T slice level and the 2 T slice level (S11), detecting the difference ΔSL of the two slice levels (S12) and discriminating whether ΔSL is equal to zero (S13). In this manner the CPU 18 repeats the steps S10 to S14 by stepwise increasing PH1 by ΔPH1 and stores the value of PH1 when ΔSL reaches zero.

Figure 8:
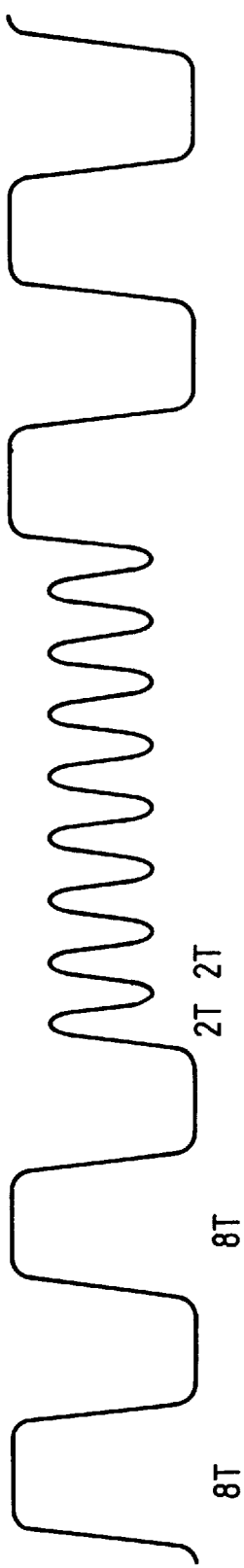
FIG. 8 is a chart showing a reproduced signal of an 8 T-continuous/2 T-continuous pattern employed in the write test method of the present invention.

As explained in the foregoing, the present embodiment employs the (1–7) codes, and the 8 T signal constituting the longest bit and the 2 T signal constituting the shortest signal are recorded, and there is detected the difference ΔSL between the slice levels (middle values of the peak and bottom values) of the two reproduced signals from such longest and shortest bits. Then there is discriminated whether ΔSL is equal to zero, and the value of PH1 is stored in the memory when it reaches zero, as will be explained. FIG. 8 shows the reproduced signal of the 8 T-continuous/2 T-continuous pattern. In this signal, the 8 T reproduced signal corresponding to the longest bit is saturated as shown in FIG. 8, and, in this state, the middle value (slice level) of the peak and the bottom can be regarded as zero.

Thus, the value of PH1 is varied so as to record 2 T with the exact length, while taking 8 T as the reference, and the value of PH1 is detected when ΔSL becomes zero. Since the slice level of the reproduced signal of 8 T can be regarded as zero, that of the 2 T reproduced signal can also be regarded as zero if the difference ΔSL between the slice levels of the 8 T and 2 T reproduced signals is zero. This means that the 2 T bit can be recorded with the exact length, so that the PH1 in this state corresponds to the power level required for exact recording of the shortest bit 2 T.

Figure 5:
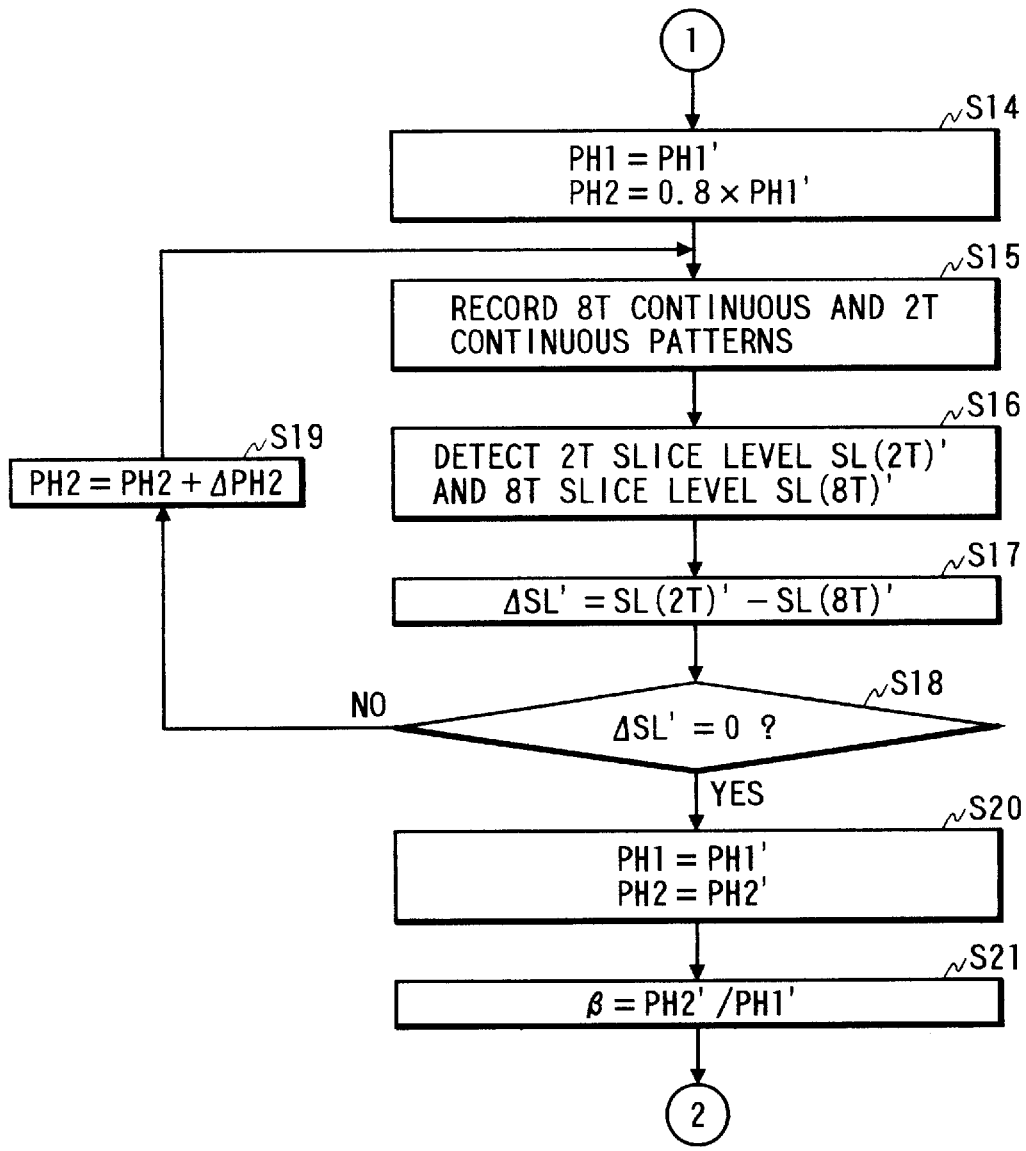
Figure 6:
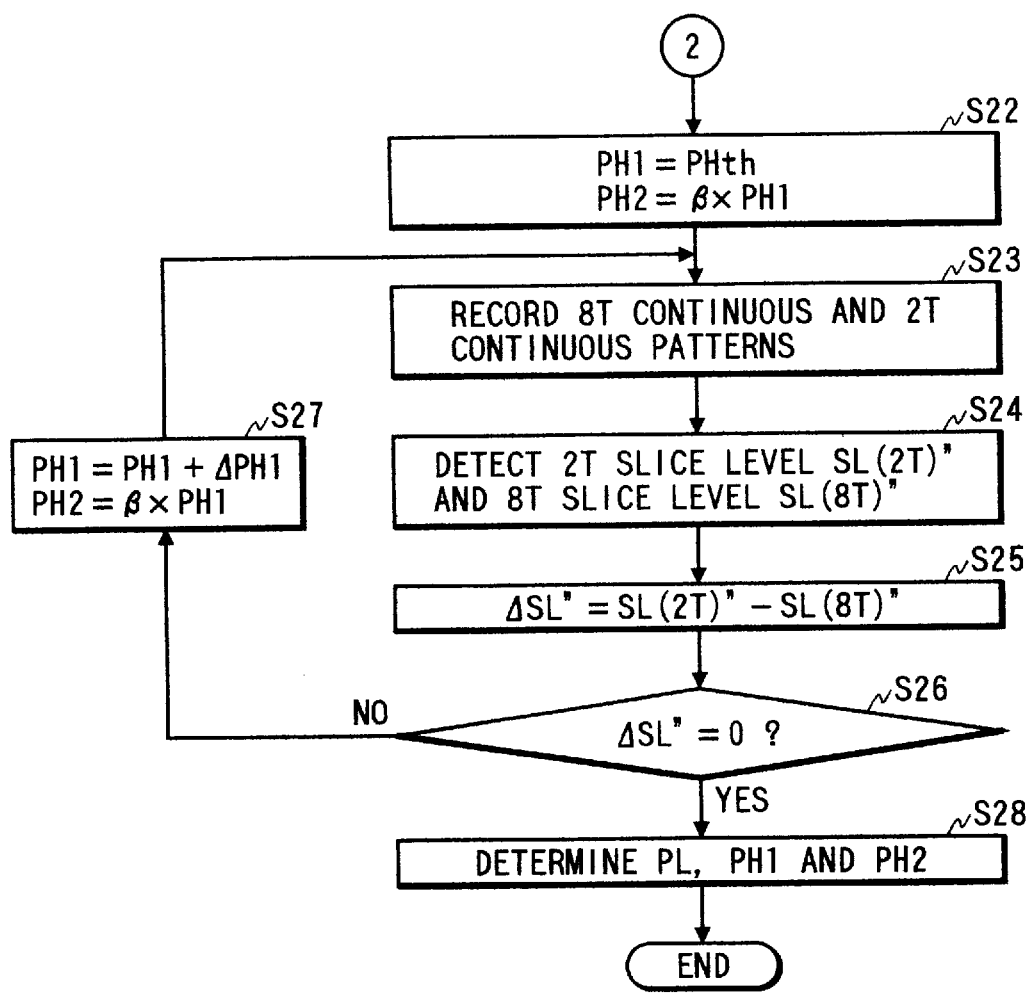

Then the CPU 18 sets the thus obtained PH1 as PH1' and determines the PH2 matching thereto, in a sequence starting from a step S14 in FIG. 5. At first, the CPU 18 sets PH1–PH1' as mentioned above and also sets the initial value of PH2 as PH2=0.8×PH1' (S14). PL is the value obtained previously. Then the CPU 18 controls the various units under these recording conditions to record an 8 T-continuous/2 T-continuous pattern in the write test area (S15), and reproduces the recorded pattern to detect the slice level SL(8 T)' of the reproduced signal of the 8 T continuous pattern and the SL(2 T)' of the reproduced signal of the 2 T continuous pattern (S16), which are detected by the asymmetry detection circuit 19 and fetched in the CPU 18. Then the asymmetry detection circuit 19 detects the difference ΔSL' between the slice levels SL(2 T)' and SL(8 T)' (S17), and the CPU 18 discriminates whether the obtained ΔSL' is equal to zero (S18).

If not, the CPU 18 adds ΔPH2 to PH2 and again effects recording of the 8 T-continuous/2 T-continuous pattern in the write test area (S19), reproduction of the recorded pattern to detect the 8 T slice level SL(8 T)' and the 2 T slice level SL(2 T)' (S16), detection of the difference ΔSL' of these two slice levels (S17) and discrimination of whether ΔSL' is equal to zero (S18). In this manner the CPU 18 repeats the steps S15 to S19 by stepwise increasing PH2 by ΔPH2 and stores the value of PH2, as PH2', when ΔSL' becomes zero (S20). Then the CPU 18 calculates a ratio β of the thus obtained PH2' and PH1' previously stored in the memory (β=PH2'/PH1') (S21). In this manner there is completed the step (2) for determining the ratio of PH2 and PH1.

In the flow chart shown in FIG. 5, as explained in the foregoing, the value of PH2 is varied and is determined when the difference ΔSL' between the slice levels of the 8 T and 2 T reproduced signals becomes zero, in the following manner. In this case there is determined the power level PH2 capable of recording the longest bit 8 T with the exact length, while taking 2 T as the reference. As the value of PH1 has already been determined for recording the shortest 2 T bit with the exact length, there is now determined the value of PH2 when the difference ΔSL' of the slice levels of the 8 T and 2 T reproduced signals becomes zero, by varying PH2. When ΔSL" becomes zero, the slice level of the 8 T reproduced signal can be regarded as zero. This means that the 8 T bit can be recorded with the exact length, so that the PH2 in this state corresponds to the power level capable of exactly recording the longest 8 T bit.

Finally there will be explained the step (3) for determining the absolute values of PH1 and PH2 by varying the recording power while maintaining a constant ratio between PH1 and PH2, with reference to a sequence starting from a step S22 in FIG. 6, following the step S21 in FIG. 5. At first, the CPU 18 sets PH1 =PHth and PH2=β×PH1 as the initial values of PH1 and PH2 (S22), wherein PHth and α are obtained respectively in S7 in FIG. 4 and S21 in FIG. 5, and PL is the previously obtained value. Then the CPU 18 instructs the device to record an 8 T-continuous/2 T-continuous pattern in the write test area of the magnetooptical disk 1 by controlling the various units under the above-mentioned initial values (S23), then reproduces the recorded pattern and detects the slice level SL(8 T)" of the reproduced signal of the 8 T continuous pattern and the SL(2 T)" of the reproduced signal of the 2 T continuous pattern (S24), by means of the asymmetry detection circuit 19. Subsequently, the asymmetry detection circuit 19 detects the difference ΔSL" of the obtained slice levels SL(2 T)" and SL(8 T)" (S25), and the CPU 18 discriminates whether the difference ΔSL" is equal to zero (S26). If not, the CPU 18 sets PH1=PH1+ΔPH1 and PH2=β×PH1, thereby renewing the recording power while maintaining a constant ratio between PH1 and PH2 (S27).

Then the CPU 18 instructs the device to effect recording of the 8 T-continuous/2 T-continuous pattern again in the write test area under the thus renewed recording conditions (S23), and then reproduction of the recorded pattern and detection of the slice levels of the 8 T continuous pattern and the 2 T continuous pattern (S24), detection of the difference ΔSL" of these two slice levels (S25) and discrimination whether ΔSL" is zero (S26). In this manner the CPU 18 repeats the steps S23 to S27 by stepwise increasing the recording power while maintaining a constant ratio between PH1 and PH2, and determines PH1 and PH2 as the desired values when ΔSL" reaches zero. The optimum power levels of PH1 and PH2 are determined through the foregoing sequences and the write test is thus completed.

As explained in the foregoing, also in the determination of the absolute values of PH1 and PH2, 2 T and 8 T bits are recorded and the values of PH1 and PH2 are determined as the optimum power levels when the difference ΔSL" of the slice levels of the 2 T and 8 T reproduced signals becomes zero. This is based on the aforementioned principle that, if the difference ΔSL" between the slice levels of the reproduced signals of the longest bit 8 T and the shortest bit 2 T is zero, the slice levels of the 8 T and 2 T reproduced signals are both zero so that both bits can be recorded with exact lengths. Consequently the values of PH1 and PH2 in this state correspond to the power levels capable of respectively recording exactly the shortest bit 2 T and the longest bit 8 T.

Figure 9:
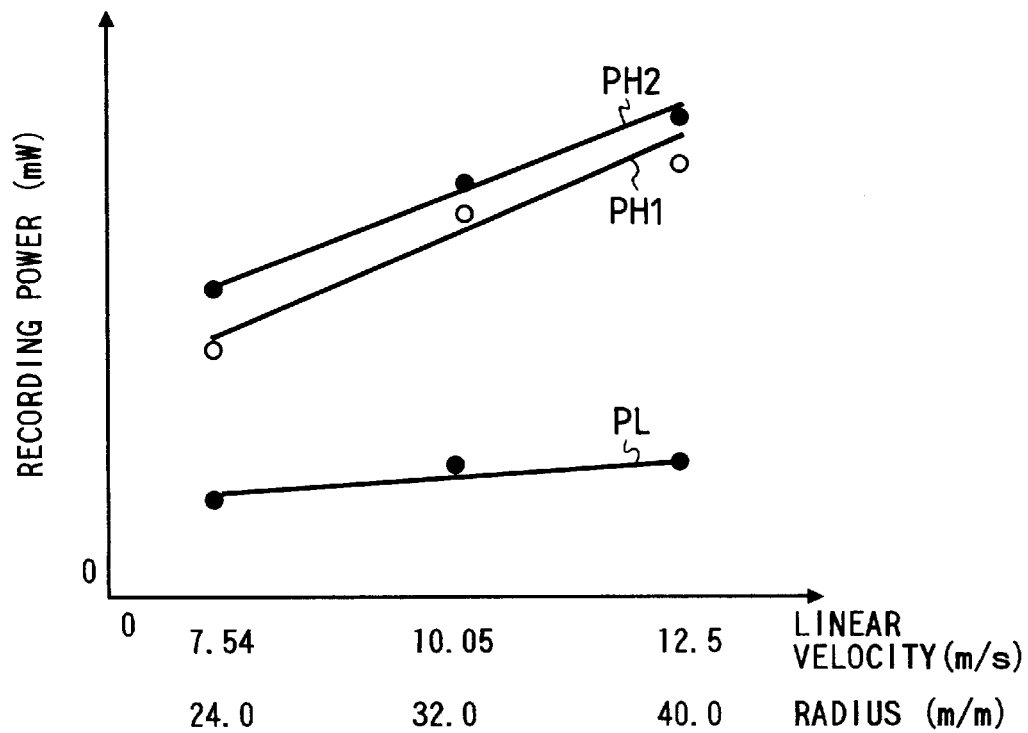
FIG. 9 is a chart showing the relationship between the radial position (linear velocity) of the disk and the recording power.

In case the linear velocity varies according to the radial recording position of the disk, as in the CAV system, it is necessary to accordingly vary the recording power of the semiconductor laser. FIG. 9 shows the relationship between the radial recording position (linear velocity) of the disk and the recording power, which are proportionally correlated. In such case, therefore, the write test explained in the foregoing in relation to FIGS. 4 to 6 is to be conducted at the internal, intermediate and external positions of the disk, and the values of PL1, PH1 and PH2 obtained in respective positions are stored in a memory and are used to vary the actual PL1, PH1 and PH2 values by linear approximation according to the radial position of the disk. Also, the write test explained above may be conducted at every exchange of a disk, or prior to each information recording, or periodically at every predetermined interval.

In the following there will be explained another embodiment of the present invention, which is the same as the foregoing write test method in the steps (1) and (3) but is different in the step (2) for determining PH2. More specifically, in the present embodiment, the PH2 is determined in the following manner after the determination of PL1 and PH1 as explained in FIG. 4.

Figure 4:
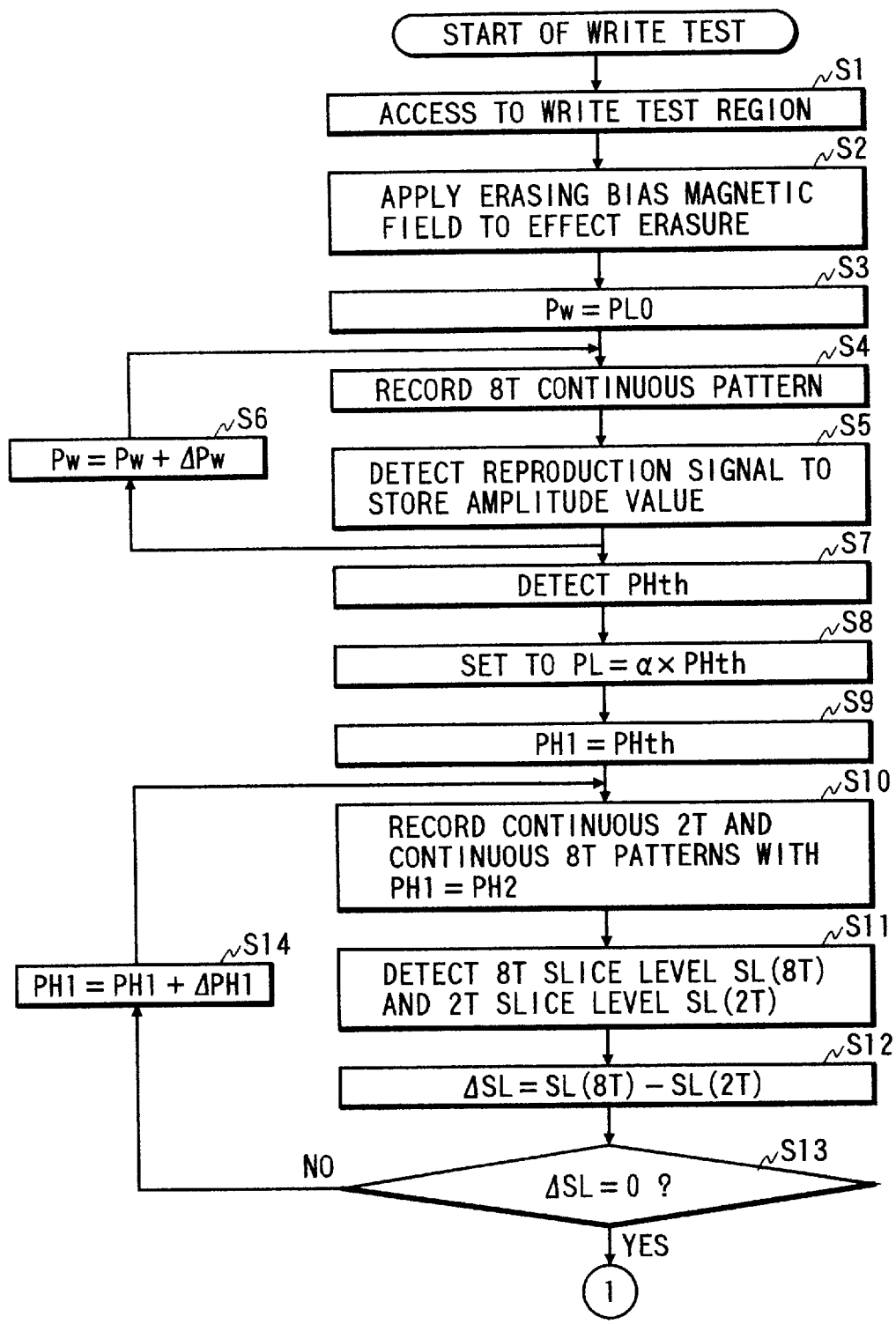
FIGS. 4 to 6 are flow charts showing a first embodiment of the write test method of the present invention.

In more detail, the PH1 obtained in the sequence of FIG. 4 is taken as PH1', while the initial value of PH2 is taken as PH2=0.8×PH1' (PL being taken as the previously obtained value), and 6 T and 8 T signals are recorded in the write test area of the magnetooptical disk with such recording powers. After the recording, the CPU 18 instructs the device to reproduce the recorded signals and detects the amplitudes of the 6 T and 8 T reproduced signals, by means of the amplitude detection circuit 17, and stores the results of detection in the memory in the CPU 18. The CPU 18 instructs the device to repeatedly perform the recording of the 6 T and 8 T signals and amplitude detection of the reproduced signals by varying the recording powers while maintaining a constant ratio between PH1 and PH2, and stores the amplitude data of the 6 T and 8 T reproduced signals in the memory, as a function of PH2.

Figure 10:
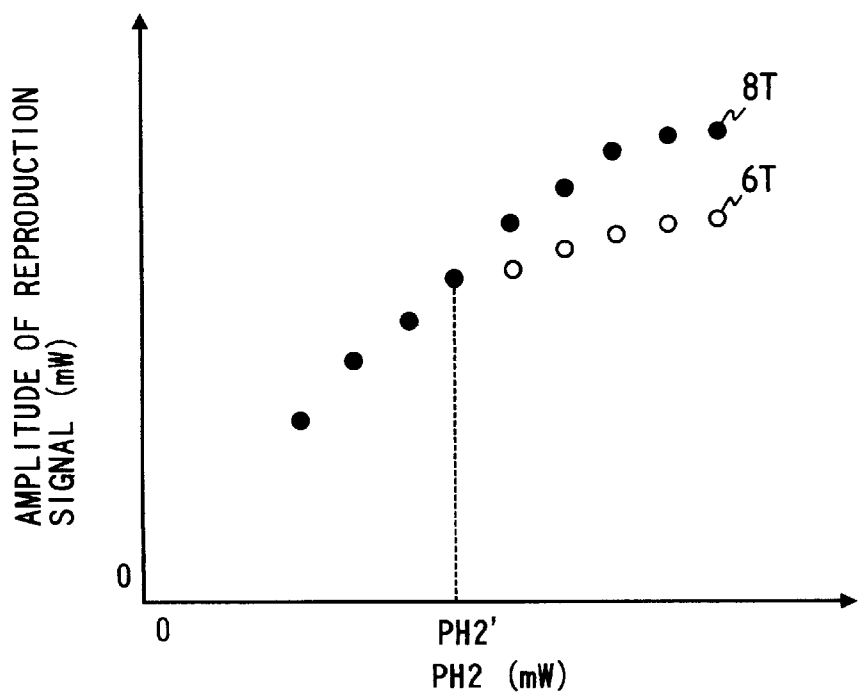
FIG. 10 is a chart showing another method for determining a power level PH2 for forming the high-temperature level state.

FIG. 10 shows such amplitude data of 6 T and 8 T reproduced signals as a function of PH2. As will be apparent from FIG. 10, the amplitudes of the 6 T and 8 T reproduced signals are mutually the same for a lower range of PH2, but becomes mutually different from a certain value of PH2. The CPU 18 determines the power as PH2' when these two amplitudes start to become different. Such a difference in the amplitude of the reproduced signal depending on the bit length is induced by a phenomenon that the recorded bit becomes a tear drop shape with the increase of PH2, more conspicuously with the increase in the length of the recorded bit.

Figure 11A:
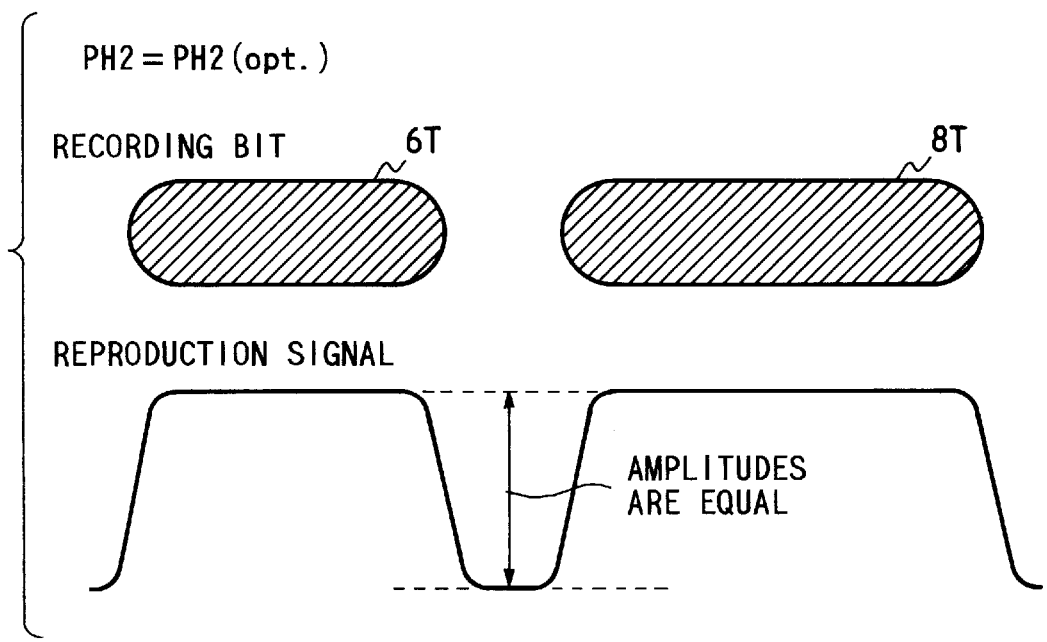
FIGS. 11A and 11 are views showing the principle of determination of PH in FIG. 10.
Figure 11B:
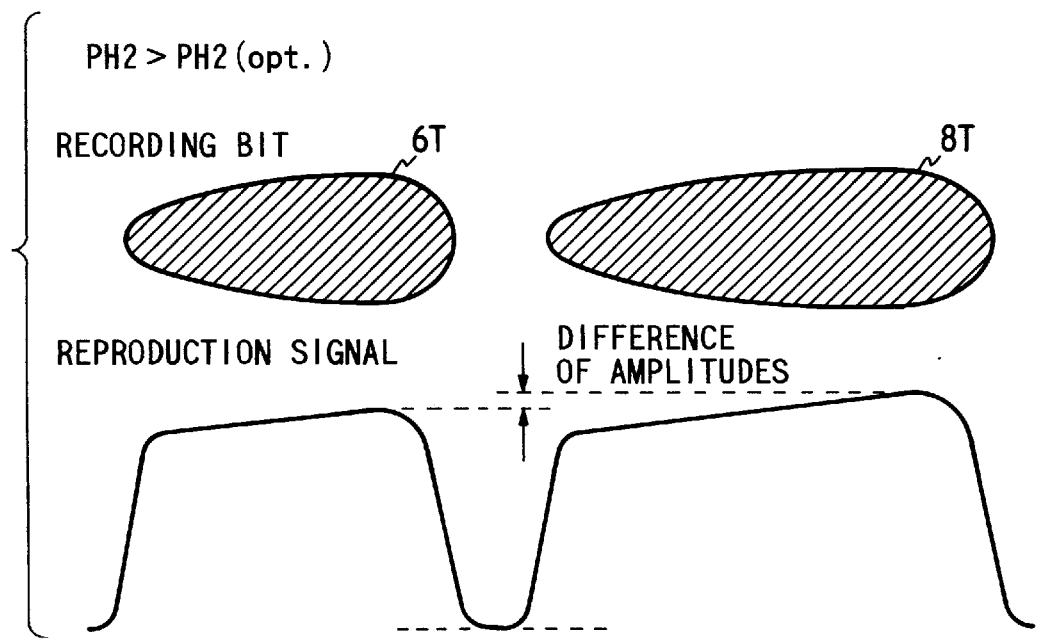

Stated differently, when the value of PH2 is optimum, the 6 T and 8 T recorded bits assume ideal forms as shown in FIG. 11A, so that the 6 T and 8 T reproduced signals have the same amplitude. On the other hand, when PH2 becomes larger than the optimum value, the 6 T and 8 T recorded bits become tear-drop shaped, as shown in FIG. 11B, so that the 6 T and 8 T reproduced signals have different amplitudes. Consequently a PH2 value where the reproduced signals start to show a difference in amplitude is identified as the optimum value. After the determination of the optimum PH2 value in this manner, there is determined the ratio to the previously determined PH1' (β=PH2'/PH1') by the sequence starting from the step S20 in FIG. 5, and then the values of PL, PH1 and PH2 are determined by the sequence shown in FIG. 6.

Also in the present embodiment, in case of the CAV process, the write tests are conducted in the inner, intermediate, and outer positions of the disk to store the PL1, PH1 and PH2 values obtained in respective positions in a memory, and the optimum recording powers corresponding to the radial recording position are determined, based on the thus stored data.

Figure 12A:
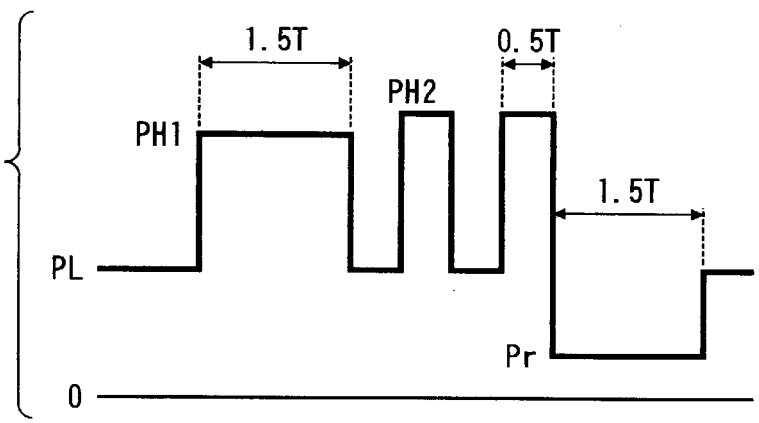
FIGS. 12A to 12C are charts showing other examples of the laser turn-on form of the 4 T pattern.
Figure 12B:
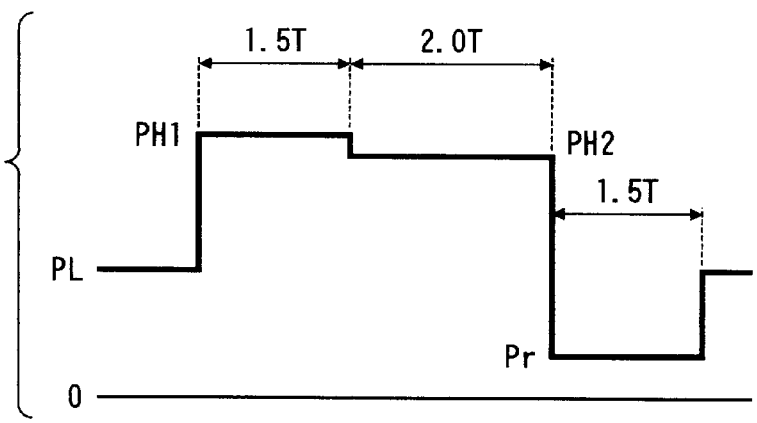
Figure 12C:
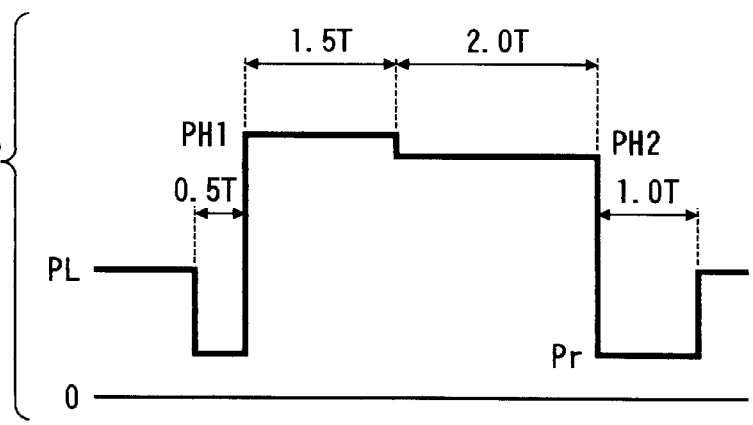

In the foregoing embodiments, the laser turn-on wave form as shown in FIG. 3 is employed, both the invention is not limited to such a wave form and there may be employed, for example for recording, the 4 T pattern as in FIG. 3, a wave form as shown in FIG. 12A, 12B or 12C.

Figures 13A, 13B, 13C:
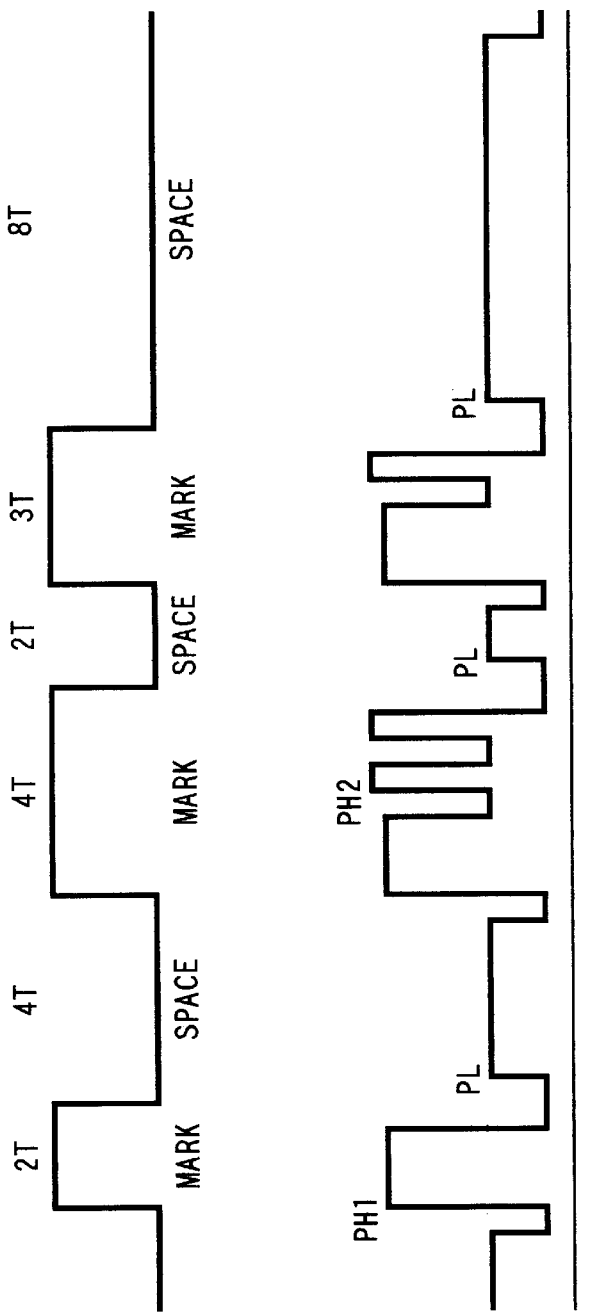
FIGS. 13A to 13C are charts showing a recorded pattern and corresponding laser control signals, showing comparison of DC turn-on and pulsed turn-on of the laser in space areas.

Furthermore, the present invention is applicable also in case the low-temperature level state is generated by pulsed turn-on of the laser. FIG. 13A shows a pattern to be recorded, while FIGS. 13B and 13C show corresponding laser turn-on wave forms, respectively, in case the low-temperature level state (space area) is generated by DC turn-on and by pulsed turn-on. In the foregoing embodiments, the laser is DC turned on in the space area as shown in FIG. 13B, but the present invention is applicable also in case it is turned on in a pulsed manner as shown in FIG. 13C. In such case, however, it is to be noted, in the determination of the PL level from the PHth value where the high-temperature process is started according to the equation PL=α'×PHth, that α' has to be so selected as to satisfy α'>1.0 in contrast to the foregoing embodiments. Such formation of the low-temperature level state by the pulsed turn-on of the laser provides an advantage of improving the accuracy of laser power control for the low-temperature level state.

Also in the foregoing embodiments, the PHth immediately before the formation of the high-temperature level state is determined by recording an 8 T continuous pattern and obtaining a recording power where the amplitude of the reproduced signal starts to increase, but the mark portion of the 8 T continuous signal in the test pattern may also be recorded by pulsed turn-on of a length of T/2. In such a case, the PL level is determined from PHth by an equation PL=γ×PHth, wherein γ<1.0.

Also in the foregoing embodiments there has been explained a write test controlled by four values PL, PH1, PH2 and Pr, but the present invention is not limited to such a case and is applicable also, for example, to a case controlled by three values PL, PH and Pr. In such a three-value controlled case, the write test is conducted in the following manner. At first, steps S1 to S8 in FIG. 4 are executed in the same manner as in the four-value control to detect PHth, according to which PL is set. Then, since the high-temperature level state (for recording) in the three-value control is solely determined by the power level PH, the step S9 in FIG. 4 sets PH=PHth, and the step S10 records the 8 T-continuous/2 T-continuous pattern with the thus set power level PH.

Subsequently the step S11 reproduces the recorded pattern and detects the slice levels of the 8 T and 2 T reproduced signals, then the step S12 detects the difference ΔSL of the slice levels of the 8 T and 2 T signals, and the step S13 discriminates whether ΔSL is zero. If not, the step S14 renews the recording power by adding ΔPH to PH and again effects recording of the 8 T-continuous/2 T-continuous pattern, detection of the slice levels of the reproduced signals, detection of the difference ΔSL of the slice levels and discrimination of whether ΔSL is zero. The sequence of the steps S10 to S14 is thus repeated, and the PH when ΔSL reaches zero is determined as the optimum power level. Thus, the optimum values of PL and PH are determined, and the write test for the three-value control case is completed. In this manner the present invention is applicable also to the write test with three-value control.

[Second Embodiment]

In the following there will be given a detailed explanation of a second embodiment of the present invention. The configuration of the optical information recording/reproducing apparatus constituting the second embodiment will not be explained as it is same as in the configuration shown in FIG. 2.

Figure 14:
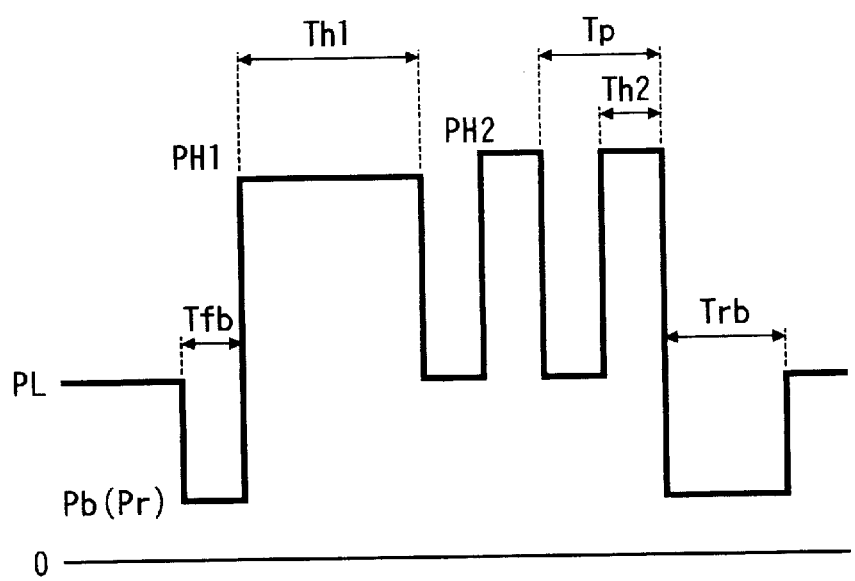
FIG. 14 is a chart showing the laser turn-on wave form for recording a 4 T pattern in a second embodiment.

FIG. 14 is a chart showing the turn-on wave form of the semiconductor laser 5 of the present embodiment, for example, in case of recording a 4 T pattern, wherein PL is a power level for forming a lower-temperature level state (for erasure) in the magnetic film 2 of the magnetooptical disk 1, PH1 and PH2 are power levels for forming a high-temperature level state (for recording), and Pr is a constant reproducing power. The reproducing power Pr is the same as the bottom recording power Pb, which is provided for a period Tfb (0.5 T) before PH1 and for a period Trb (1.0 T) after PH2. Tfb and Trb are respectively called a front cooling gap and a rear cooling gap. The PH1 is provided for a period of Th1 (1.5 T). The PH2 effects pulsed turn-on at an interval of 0.5 T, with a cycle time Tp (1.0 T) and a turn-on time Th2 (0.5 T). In the present embodiment, the recording power of the semiconductor laser 5 is controlled with four values PL, PH1, PH2 and Pr as shown in FIG. 14, and PL, PH1 and PH2 are set at optimum values by the write test.

Figure 15A:
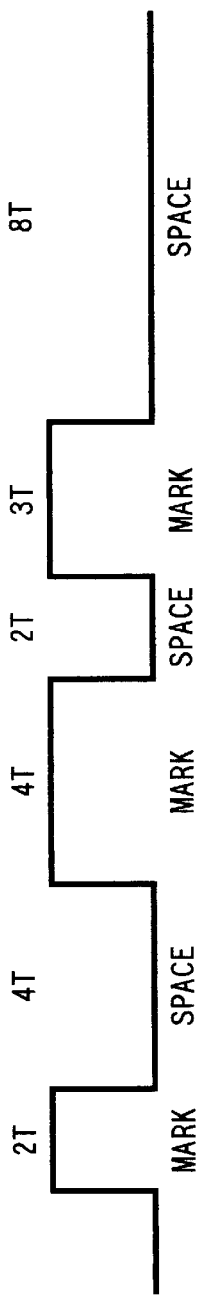
FIGS. 15A to 15C are charts showing a recorded pattern and corresponding laser turn-on wave forms in the second embodiment.
Figure 15B:
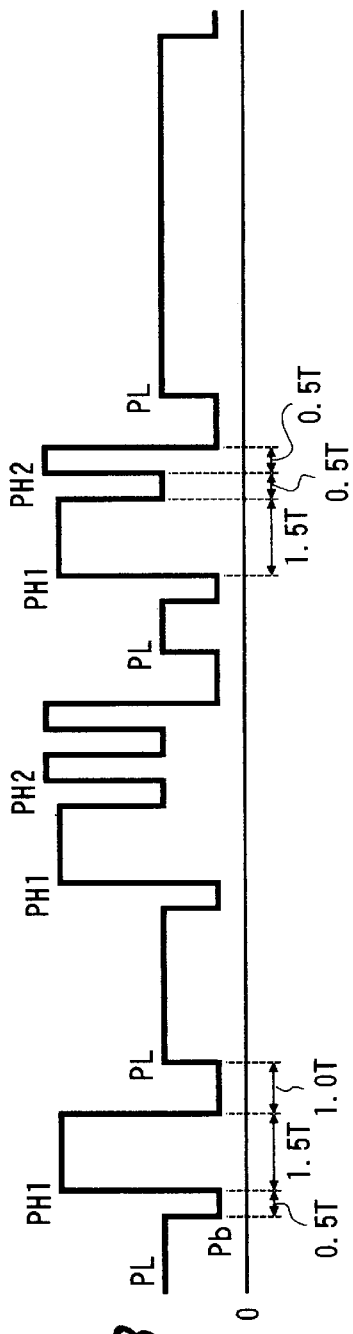
Figure 15C:
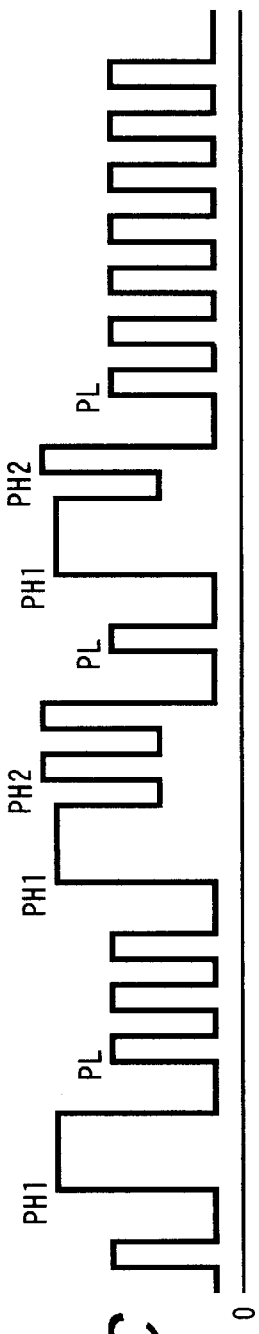

FIGS. 15A to 15C show the correspondence between the recorded pattern and the laser turn-on wave forms. FIG. 15A shows the recorded pattern while FIG. 15B shows the corresponding laser turn-on wave form. In the present embodiment, in recording the space area of the recorded pattern, the semiconductor laser 5 is DC turned on as shown in FIG. 15B. A 4 T mark is recorded with the laser turn-on wave form as shown in FIG. 14, while a 2 T mark is recorded with a wave form consisting solely of PH1 as shown in FIG. 15B. A 3 T mark is recorded, as shown in FIG. 15B, by the combination of a PH1 wave form the same as that for recording a 2 T or 4 T mark and a PH2 pulse. Though not shown in FIG. 15B, a 5 T mark is recorded with a PH1 wave form and three PH2 pulses. Similarly the number of PH2 pulses increases to 4, 5 or 6 respectively for a 6 T, 7 T or 8 T mark.

Such a laser turn-on at first with PH1 followed by a pulsed turn-on with PH2 is done to maintain the recording medium at a predetermined temperature, and to prevent excessive heating. Also, such control of PH1 and PH2 can suppress fluctuation in the bit edge. Consequently such a control method for the laser beam can be advantageously used in the aforementioned bit edge recording, in which information is given to the edge position of each bit. As explained in the foregoing, the space area is recorded with DC turn-on with the power PL. The present embodiment employs the (1–7) codes as explained before, in which the shortest and longest bits are respectively 2 T and 8 T. FIG. 15C shows a laser turn-on wave form in case the pulsed turn-on is used for the space area, as will be explained later in more detail.

In the following there will be explained the write test method of the present embodiment. At first there will be explained the relation of the recording power levels PL, PH1 and PH2 in the multi-value control of the semiconductor laser 5 explained in relation to FIG. 14. The temperature change in the medium by laser irradiation can be approximately represented by the following equations:

$$\text{Temperature change at heating} = P_0 \times (1 - \exp^{-T_0/\gamma}) \quad (1)$$

$$\text{Temperature change at cooling} = P_0 \times \exp^{-T_0/\gamma} \quad (2)$$

wherein γ is a thermal diffusion constant characterized by the thermal characteristics and linear velocity of the recording medium, $P_0$ is the laser power level, and $T_0$ is the laser turn-on time.

The foregoing equations (1) and (2) representing the heating and cooling processes lead to the following equation of heat isolation:

$$(PL-Pb) \times (1-\exp^{-Ts/\gamma}) = (PH1-Pb) \times (1-\exp^{-Th1/\gamma}) \times (\exp^{-Trb/\gamma}) \quad (3)$$

wherein Th1 is the duration of PH1 as shown in FIG. 14, Trb is the duration of Pr after PH2, and Pr is the bottom value of the laser power at recording. Ts is the sum of the durations of cooling gaps Tfb, Trb and the duration Th1 of PH1 as shown in FIG. 14, namely:

$$Ts = Tfb + Th1 + Trb \quad (4)$$

The foregoing equation (3), representing the relationship between PL and PH1, is based on the following fact, to be explained by the laser turn-on wave form for the 2 T pattern shown in FIG. 15B. Referring to FIG. 15B, the temperature of the recording medium after the durations of 0.5 T of the front cooling gap, 1.5 T of PH1 and 1.0 T of the rear cooling gap has to be the same as that of the recording medium if the power is maintained at PL throughout these durations. This requirement can be translated into the equation (3) representing the relationship between PL and PH1.

Also from the equations (1) and (2), there can be derived a multi-pulse relation, representing the relationship between PH1 and PH2, as follows:

$$(PH1-PL) \times (1-\exp^{-Th2/\gamma})(1-\exp^{-Tp/\gamma}) = (PH2-PL) \times (1-e^{-Th2/\gamma}) \quad (5)$$

wherein Th1 is the duration of PH1 as shown in FIG. 14, TP is the cycle time of the pulse of PH2, and Th2 is the duration of the pulse of PH2.

The foregoing equation (5), representing the relationship between PH1 and PH2, is based on the following fact, to be explained by the laser turn-on wave form for the 3 T pattern shown in FIG. 15B. The temperature of the medium after the duration of 1.5 T of PH1 has to be same as that of the medium after the durations of 1.5 T of PH1, 0.5 T at the PL level and 0.5 T of PH2. This requirement can be translated into the equation (5), representing the relationship between PH1 and PH2. This embodiment, as will be explained later in more detail, calculates PH1 and PH2 by the equations (3) and (5) at the write test, and effects test recording on the disk 1 with the thus calculated values, thereby adjusting PH1 and PH2 to optimum values.

Now the details of the write test method of the present embodiment will be explained with reference to a flow chart in FIG. 16. This write test is executed when the magneto-optical disk 1 is set on the apparatus shown in FIG. 2, namely when the disk 1 is exchanged. The write test of the present embodiment is principally composed of the following two steps:

(1) a step for detecting the laser power level PHth immediately before the formation of the high-temperature level state, in order to determine the laser power level PL for forming the low-temperature level state on the magnetooptical disk 1; and (2) a step for determining the values of PH1 and PH2 for forming the high-temperature level state on the magnetooptical disk 1, according to the foregoing equations (3) and (5).

At first there will be explained the step (1) for determining PHth, and the laser power level PL. Referring to FIG. 16, in case of the write test, the CPU 18 instructs the device to move the optical head 4 to a predetermined write test area of the magnetooptical disk 1 (S1). Then the CPU 18 controls the drive circuit (not shown) for the bias magnet 13 and the semiconductor laser driving circuit 20, thereby applying an erasing bias magnetic field to the write test area and scanning the write test area with an erasing light beam to erase the write test area (S2). After the erasure, the CPU 18 sets an initial value Pw for the recording power of the semiconductor laser 5 (S3), for example by taking PL with which recording is performed in a control track of the magnetooptical disk 1.

After the setting of the initial value of the recording power, the CPU 18 controls the various units to record an 8 T continuous pattern in the write test area with the power of such initial value (S4), and subsequently reproduces the thus recorded 8 T continuous pattern for detecting the amplitude level of the reproduced signal (S5), by means of the amplitude detection circuit 17. The obtained amplitude level is fetched into the CPU 18 by the A/D converter therein, and stored in an internal memory (S5). After such recording and reproduction with the initial value, the CPU 18 increases the recording power by adding ΔPw to the recording power Pw (S6), then records the 8 T continuous pattern with the thus increased recording power in the write test area (S4), reproduces the recorded signal and detects and stores the amplitude level of the reproduced signal (S5).

By repeating the steps S4 to S6 with stepwise increases of the recording power to a predetermined recording power level, there can be determined the relationship between the recording power and the amplitude of the reproduced signal as shown in FIG. 7. The predetermined recording power can be, for example, twice the PH with which recording is effected on the control track of the magnetooptical disk 1.

The above-mentioned PHth immediately before the formation of the high-temperature level state varies according to the temperature, depending on the characteristics of the medium. The present invention is based on this property and determines PL, PH1 and PH2 based on PHth, thereby setting the recording power corresponding to the variation in temperature. The CPU 18 determines PHth from the data of the recording power and the reproduced signal amplitude stored in the memory and stores PHth in the memory (S7). In this manner the step (1) for determining PHth is completed. The present embodiment employs (1–7) codes for modulating information to be recorded, and the longest bit 8 T in this code system is used for the detection of the reproduced signal amplitude.

In the following there will be explained the step (2) for determining the laser power levels PH1 and PH2 for forming the high-temperature level state, from the equations (3) and (5), again with reference to FIG. 16. At first the CPU 18 instructs the device to set the laser power level PL for forming the low-temperature level state as PL =α×PHth (S8), utilizing the PHth determined in advance, wherein α is defined by PLmin/PHth<α<1.0. In this manner the value of PL is determined.

Figure 17:
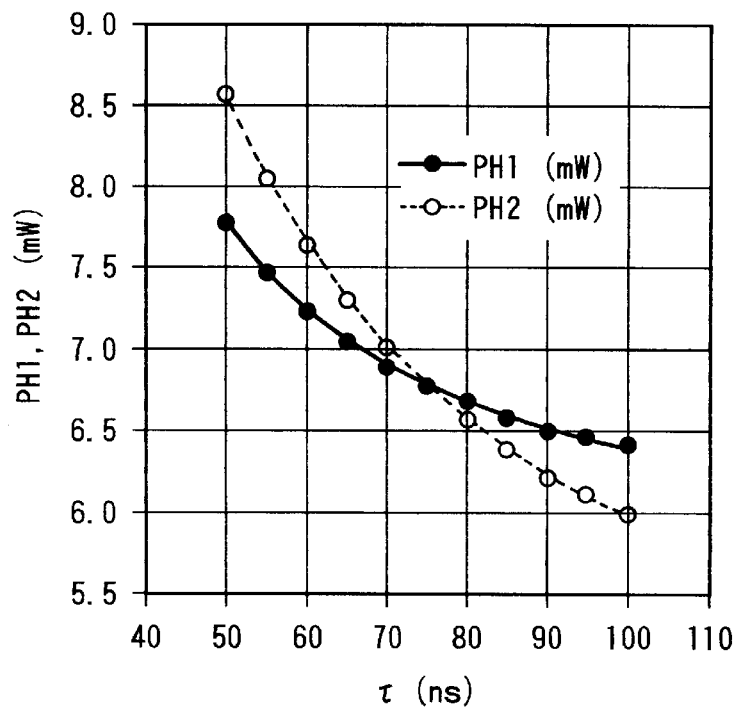
FIG. 17 is a chart showing the relationship between the thermal diffusion constant and PH1 and PH2.

Then, for calculating the laser power level for forming the high-temperature level state, the CPU 18 sets the initial value of the thermal diffusion constant γ as about T (S9). This value can be selected in an arbitrary manner and employs, in this example, the cycle time T of the basic clock of the recording signal. Then, the CPU 18 calculates PH1 and PH2 from the equations (3) and (5), based on the value γ (S10). FIG. 17 shows the relationship between PH1, PH2 and the thermal diffusion constant γ, wherein PH1 represented by black circles and PH2 represented by white circles decrease with the increase in the thermal diffusion constant γ. The CPU 18 instructs the device to record an 8 T-continuous/2 T-continuous pattern in the write test area of the magnetooptical disk 1 with the thus calculated PH1 and PH2, wherein PL is the value obtained previously (S11).

After the recording of the 8 T-continuous/2 T-continuous pattern, the CPU 18 instructs the device to reproduce this pattern by controlling various units and detects the slice level SL(8 T) of the reproduced signal of the 8 T pattern and the SL(2 T) of the reproduced signal of the 2 T pattern (S12). More specifically, the asymmetry detection circuit 19 detects the middle values of the peak and bottom values of the reproduced signals of the 8 T continuous pattern and the 2 T continuous pattern, then detects the difference ΔSL between the slice level SL(8 T) of the reproduced signal of the 8 T continuous pattern and the SL(2 T) of the reproduced signal of the 2 T continuous pattern (S13), and the obtained ΔSL is fetched in the CPU 18 and stored in the memory (S14). Then, the CPU 18 adds Δγ to γ (S15), and effects again calculation of PH1 and PH2 by substituting the thus increased value in the equations (3) and (5) (S10), recording of the 8 T/2 T continuous pattern with the thus obtained PH1 and PH2 values (S11), detection of the slice levels of the reproduced signals (S12), detection of ΔSL (S13) and storage thereof (S14).

Figure 18:
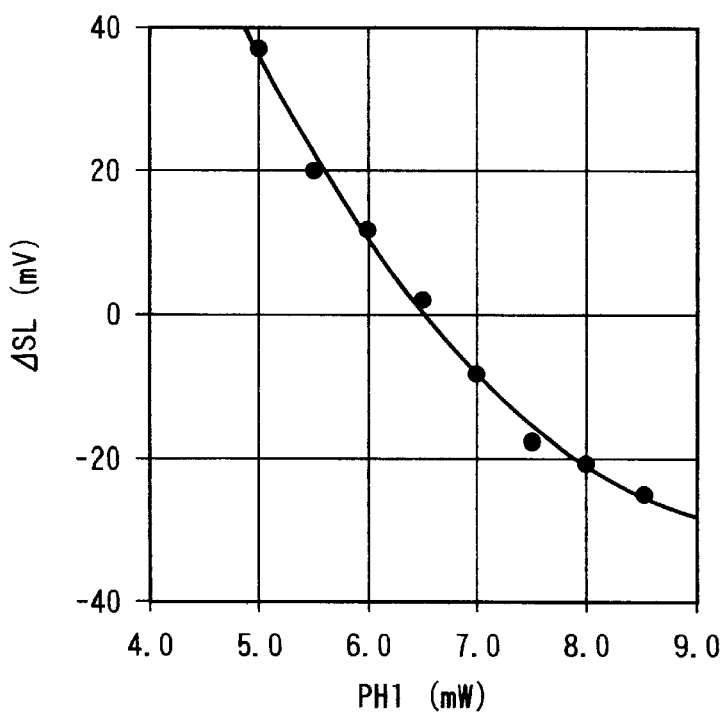
FIG. 18 is a chart showing the relationship between a slice level difference $\Delta SL$ of the reproduced signals of an 8 T continuous pattern and a 2 T continuous pattern, and PH1.

The CPU 18 repeats the steps S10 to S14 with a stepwise increase of γ by Δγ until a predetermined value of γ, with detection, each time, of the difference ΔSL between the slice level SL(8 T) of the reproduced signal of the 8 T continuous pattern and the SL(2 T) of the reproduced signal of the 2 T continuous pattern, whereby there can be obtained data as shown in FIG. 18. FIG. 18 shows the relationship between ΔSL and PH1, which was obtained by calculating PH1 and PH2 from the equations (3) and (5) with different values of γ, then recording the 8 T/2 T continuous pattern with the thus obtained values and measuring the difference ΔSL between the slice levels of the 8 T and 2 T reproduced signals. Though not illustrated, similar data can also be obtained for PH2. Based on these results, the optimum values of PH1 and PH2 can be determined from the value of γ when ΔSL (=SL(8 T)–SL(2 T)) becomes zero. In this manner, the optimum values of PL, PH1 and PH2 are determined (S18) and the write test is completed. The multi-level recording powers of the semiconductor laser 5 are set respectively to the optimum values obtained in the write test, and the information recording is thereafter conducted with such optimum recording powers.

Figure 19A:
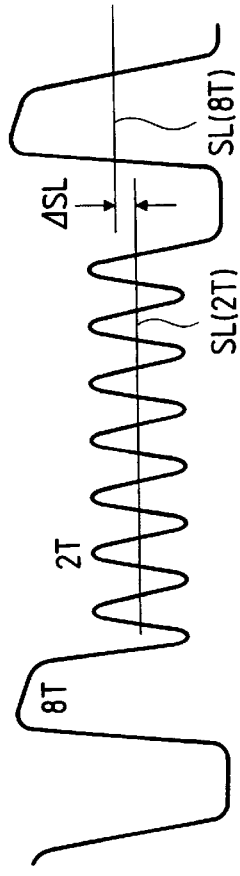
FIGS. 19A to 19C are charts showing reproduced signals of an 8 T-continuous/2 T-continuous pattern for different PH1 and PH2 values.
Figure 19B:
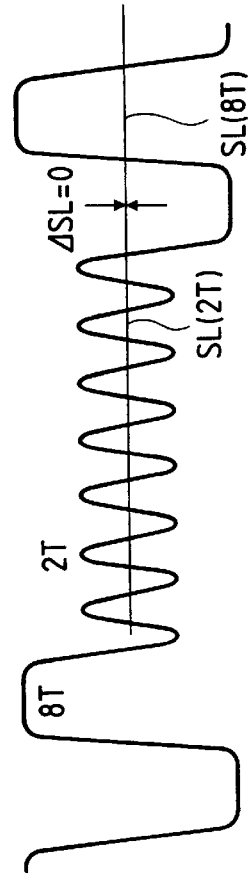
Figure 19C:
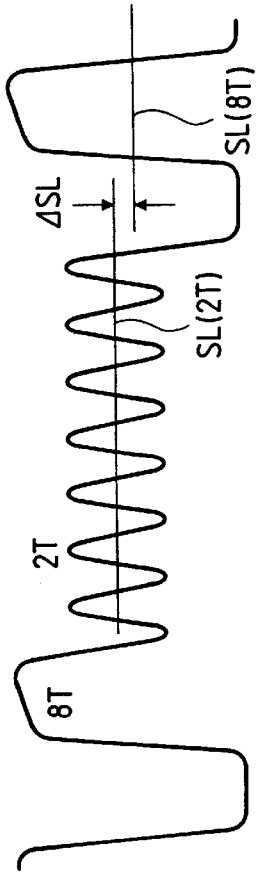

As explained in the foregoing, the present embodiment employs the (1–7) codes and detects the difference ΔSL between the slice levels (middle values between the peak and bottom values) of the two reproduced signals of the longest and shortest bits. FIGS. 19A to 19C illustrate the reproduced signals of the 8 T-continuous/2 T-continuous pattern for different values of PH1 and PH2. FIG. 19A shows a reproduced signal wave form in case PH1 and PH2 are lower than the optimum values, wherein the 2 T continuous pattern assumes a level lower than that of the 8 T continuous pattern. In this case there is generated a difference between the slice levels of the two patterns, as shown in FIG. 19A. FIG. 19B shows a reproduced signal wave form in case Ph1 and PH2 are at the optimum levels, wherein the slice levels of the two patterns are mutually equal. FIG. 19C shows a reproduced signal wave form in case PH1 and PH2 are higher than the optimum levels, wherein the 2 T continuous pattern assumes a higher level than that of the 8 T continuous pattern. Consequently, in this case, there is generated a difference between the slice levels of the two patterns, as shown in FIG. 19C.

As shown in FIG. 19A to 19C, the reproduced signal of the longest 8 T bit is in the saturated state, and, in this state, the middle value of the peak and bottom values, or the slice level, of the 8 T reproduced signal can be regarded as 0. Thus, if the slice level of the 8 T reproduced signal coincides with that of the 2 T reproduced signal as shown in FIG. 19B, i.e., if ΔSL is 0, both the 2 T bit and the 8 T bit can be considered as recorded with respectively exact lengths. Consequently PH1 and PH2, calculated with γ when the condition ΔSL=0 is satisfied, become the optimum power levels PH1opt, PH2opt.

Figure 20:
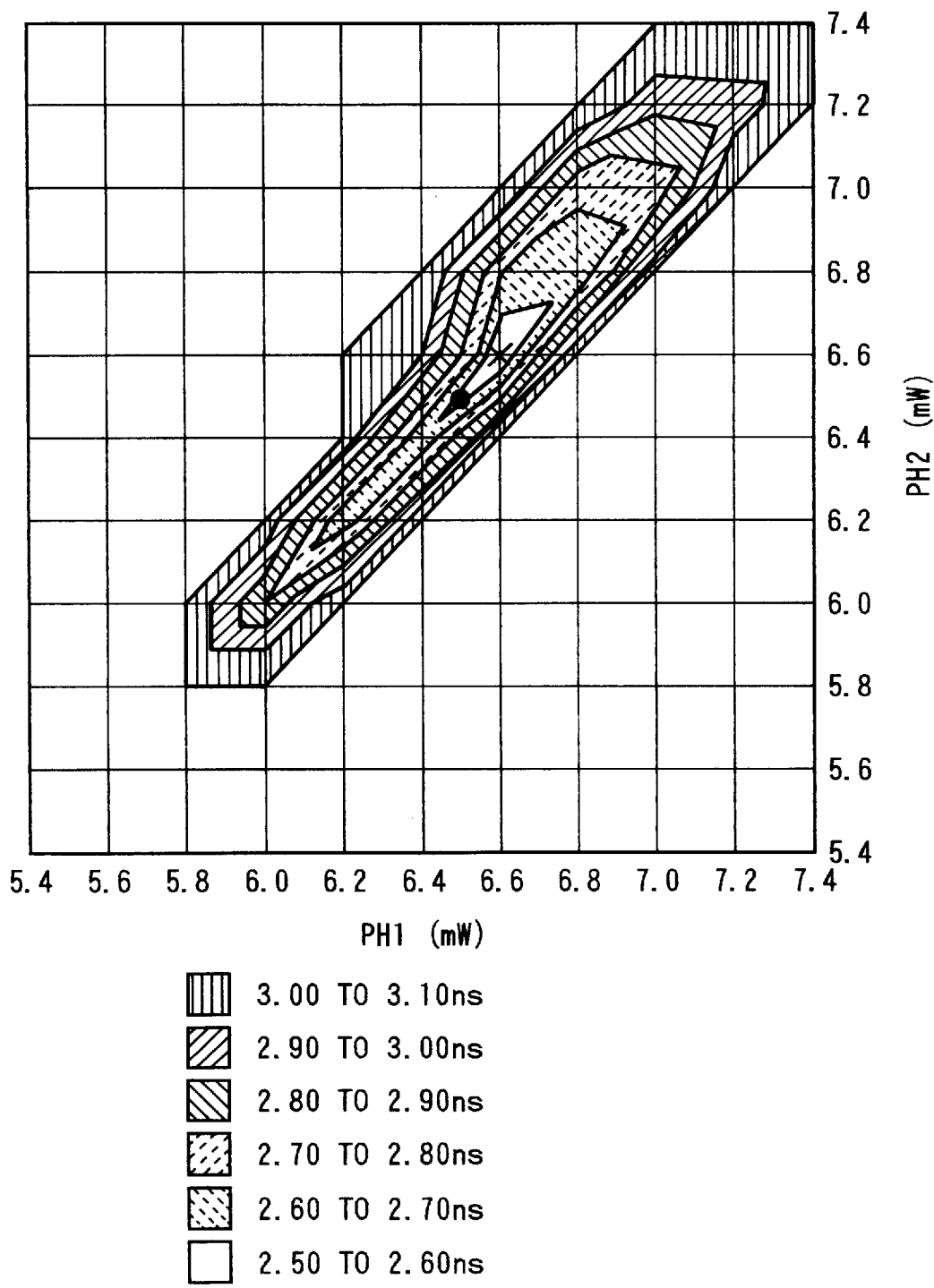
FIG. 20 is a chart showing the result of confirmation of the write test.

The present inventors have conducted the following experiment for confirming whether the PH1 and PH2, obtained in the write test explained above, are in fact the optimum recording powers. Random (1–7)-modulated signals of a maximum frequency of 5.90 MHz (γ=42,37 ns) were recorded on the magnetooptical disk 1 with a linear velocity of 2.56 m/s (revolution 3000 rpm and radial recording position 40.0 mm) with different values of PH1 and PH2, and jitter was measured at the upshift and downshift edges of the reproduced signal. The larger one of the jitters on both edges was picked and plotted to provide the results shown in FIG. 20. The recording power PHth immediately before the formation of the high-temperature level state was 4.0 mW, on which PL was selected as 3.6 mW, with α=0.9. FIG. 20 is a map showing the level of jitter as functions of PH1 and PH2, represented respectively in the abscissa and in the ordinate.

In FIG. 20, the jitter of the reproduced signal is classified into six levels, with a best level in a range of 2.50 to 2.60 ns and a worst level in a range of 3.00 to 3.10 ns. The plotting of jitter as functions of PH1 and PH2 in the form of FIG. 20 allows the evaluation of PH1 and PH2 by the level of the jitter. More specifically, in FIG. 20, the jitter is smallest in the center of the contour lines and becomes larger at the outer contours. Consequently, in FIG. 20, a position marked with x at the center of contours indicates the recording conditions with smallest jitter, corresponding to 6.6 mW for PH1 and 6.6 mW for PH2.

On the other hand, a position marked with a black circle indicates PH1 and PH2 obtained by the above-explained write test. As shown in FIG. 18, PH1 is 6.5 mW when ΔSL becomes zero, and PH2 is similarly 6.5 mW when ΔSL becomes zero though it is not illustrated. As shown in FIG. 20, the position of mark x, representing the experimentally confirmed optimum conditions of PH1 and PH2 providing the smallest jitter, substantially coincides with the position of the black circle, representing the optimum recording conditions obtained according to the present invention. This fact indicates that the write test method of the present invention allows exact recording of the bits with minimized jitter in the reproduced signal, thus confirming that the recording powers in multi-value control are appropriately adjusted.

The recording power need not be varied if the linear velocity of the disk 1 is constant regardless of the recording position, but it has to be adjusted if the linear velocity of the disk 1 varies depending on the radial recording position, as in the case of a CAV process. As shown in FIG. 9, a substantially linear relationship stands between the linear velocity and the recording power. Consequently, in such case, the write test explained in FIG. 16 is to be conducted, for example in the inner, intermediate and outer positions of the disk 1, and the values of PL, PH1 and PH2 obtained in respective positions are stored in a memory and are used to vary the values of PL, PH1 and PH2 by linear approximation, depending on the radial position on the disk 1. Also in the foregoing explanation, it is assumed that the write test is conducted at each exchange of the disk 1, but it may also be conducted prior to each information recording, or periodically at a predetermined interval even after the disk 1 is loaded.

Figure 21:
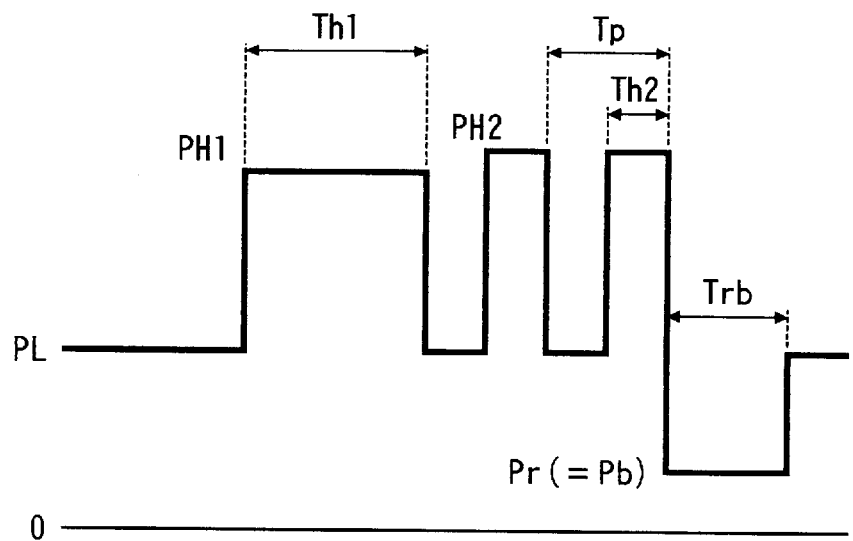
FIG. 21 is a chart showing another example of the laser turn-on wave form of the 4 T pattern.

Also in the foregoing embodiment, the laser is assumed to be turned on with the wave form shown in FIG. 14, but the present invention is not limited to such a wave form and may employ a turn-on wave form as shown in FIG. 21, which is for similarly recording a 4 T pattern as in the wave form in FIG. 14, but is different in that Tfb is 0. The present invention is applicable also in this case, but it is to be noted that the equation of heat isolation assumes the following form, because of the absence of the cooling gap at the front edge as shown in FIG. 21:

$$(PL-Pb) \times (1-\exp^{-Ts/\gamma}) = (PH1-Pb) \times (1-\exp^{-Th1/\gamma})(\exp^{-Trb/\gamma}) \quad \text{(b 6)}$$

wherein Ts=Th1+Trb.

Also in the foregoing embodiment, it is assumed that the laser is DC turned on in the space area as shown in FIG. 15B, but the present invention is applicable also in case pulsed turn-on is used in the space area as shown in FIG. 15C. In such case, however, in the determination of the PL level from the PHth immediately before the formation of the high-temperature level state by PL =α'×PHth, a condition α'>1.0 is employed in contrast to the foregoing embodiment. Such formation of the low-temperature level state by the pulsed turn-on provides an advantage of improving the precision of the laser power control for the low-temperature level.

Also in the foregoing embodiment, the PHth immediately before the formation of the high-temperature level state is determined by recording an 8 T continuous pattern and finding a recording power where the amplitude of the reproduced signal starts to increase, but the mark portion of the 8 T continuous signal in the test pattern may also be recorded by pulsed turn-on of a length of T/2. In such case the PL level is determined from PHth by an equation PL=β×PHth, where coefficient β satisfies β<1.0. Also the foregoing embodiment has been explained by the (1–7) modulation process, but the present invention is naturally applicable to other modulating methods.

[Third Embodiment]

In the following there will be given a detailed explanation on a third embodiment of the present invention, with reference to the attached drawings.

FIG. 22 shows an optical information recording/reproducing apparatus constituting a third embodiment of the present invention, wherein components the same as those in the foregoing embodiments are represented by the same numerals and will not be explained further. In comparison with the configuration of the foregoing embodiments, that shown in FIG. 22 is additionally provided with a differentiating circuit 21 for differentiating the reproduced signal and a differential signal amplitude detection circuit 22 for detecting the positive and negative amplitudes of the signal differentiated by the differentiating circuit 21. The amplitudes detected by the differential signal amplitude detection circuit 22 are also used for regulating the power level of the semiconductor laser 5.

Figure 23:
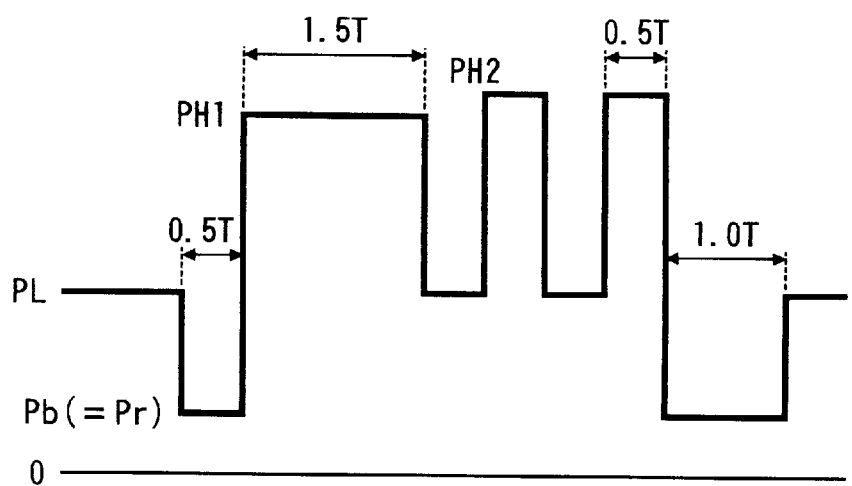
FIG. 23 is a chart showing a laser turn-on wave form for recording the 4 T pattern in the third embodiment.

FIG. 23 is a chart showing the turn-on wave form of the semiconductor laser 5 of the present embodiment, for example in case of recording a 4 T pattern, wherein PL is a power level for forming a low-temperature level state (for erasure) in the magnetic film 2 of the magnetooptical disk 1, PH1 and PH2 are power levels for forming a high-temperature level state (for recording), and Pr is a constant reproducing power. The reproducing power Pr is the same as the bottom recording power Pb, which is provided for a period of 0.5 T before PH1 and for a period of 1.0 T after PH2. They are respectively called a front cooling gap and a rear cooling gap. The PH1 is provided for a period of 1.5 T, while PH2 effects pulsed turn-on with an interval of 0.5 T. In the present embodiment, the recording power of the semiconductor laser 5 is controlled with four values PL, PH1, PH2 and Pr as shown in FIG. 23, and PL, PH1 and PH2 are set at optimum values by the write test.

FIGS. 24A to 24C show the correspondence between the recorded pattern and the laser turn-on wave forms. FIG. 24A shows the recorded pattern while FIG. 24B shows the corresponding laser turn-on wave form. In the present embodiment, in recording the space area of the recorded pattern, the semiconductor laser 5 is DC turned on as shown in FIG. 24B. A 4 T mark is recorded with the laser turn-on wave form as shown in FIG. 23, while a 2 T mark is recorded with a wave form consisting solely of PH1 as shown in FIG. 24B. A 3 T mark is recorded, as shown in FIG. 24B, by the combination of a PH1 wave form the same as that for recording a 2 T or 4 T mark and a PH2 pulse. Though not shown in FIG. 24B, a 5 T mark is recorded with a PH1 wave form and three PH2 pulses. Similarly the number of PH2 pulses increases to 4, 5 or 6 respectively for a 6 T, 7 T or 8 T mark.

Such a laser turn-on method at first with PH1 followed by pulsed turn-on with PH2 is designed to maintain the recording medium at a predetermined temperature, and to prevent excessive heating. Also, such a control method of PH1 and PH2 can suppress fluctuation in the bit edge. Consequently such a control method for the laser beam can be advantageously used in the aforementioned pit edge recording, in which information is given to the edge position of each bit. As explained in the foregoing, the space area is recorded with DC turn-on with the power PL. The present embodiment employs the (1–7) codes as explained before, in which the shortest and longest bits are respectively 2 T and 8 T. FIG. 24C shows a laser turn-on wave form in case the pulsed turn-on is used for the space area, as will be explained later in more detail.

Figure 26:
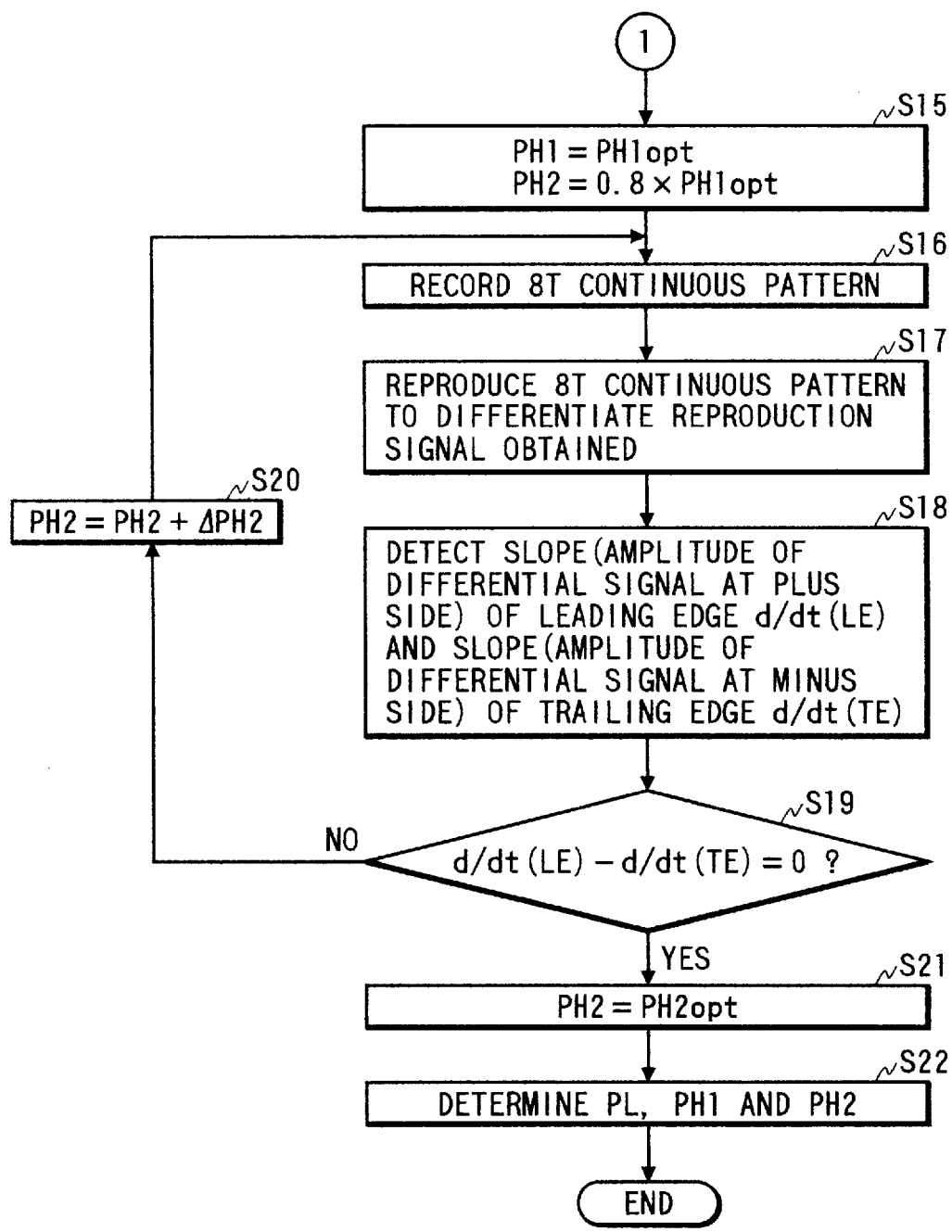

In the following there will be explained an example of the write test to be used in the apparatus shown in FIG. 22, with reference to FIGS. 25 and 26. This write test is to be conducted when the magnetooptical disk 1 is set on the apparatus shown in FIG. 22, namely at the time of exchange of the disk. The write test of the present embodiment consists principally of the following three steps:

(1) The laser power PHth immediately before the formation of the high-temperature level state is detected, for determining the laser power level PL for forming the low-temperature level state (for erasure) on the magnetooptical disk 1;

(2) The laser power level PH1, for forming the high-temperature level state (for recording) on the magnetooptical disk 1, is determined; and (3) Another laser power level PH2, for forming the high-temperature level state on the magnetooptical disk 1, is determined.

At first there will be explained the step (1) for determining the laser power level PL. Referring to FIG. 25, in case of the write test, the CPU 18 instructs the device to move the optical head 4 to a predetermined write test area of the magnetooptical disk 1 (S1). Then, the CPU 18 controls the drive circuit for the bias magnet 13 and the semiconductor laser driving circuit 20, thereby applying an erasing bias magnetic field to the write test area and scanning the write test area with an erasing light beam to erase the write test area (S2). After the erasure, the CPU 18 sets an initial value Pw for the recording power of the semiconductor laser 5, for example by taking PL with which recording is effected in a control track of the magnetooptical disk 1.

After the setting of the initial value of the recording power, the CPU 18 instructs the device to record an 8 T continuous pattern in the write test area with the power of such initial value (S4), and subsequently reproduces the thus recorded 8 T continuous pattern for detecting the amplitude level of the reproduced signal (S5), by means of the amplitude detection circuit 17. The obtained amplitude level is fetched into the CPU 18 by the A/D converter therein, and stored in an internal memory (S5). After the recording and reproduction with the initial value, the CPU 18 instructs the device to increase the recording power by adding ΔPw to the recording power Pw (S6), then the 8 T continuous pattern is again recorded with the thus increased recording power in the write test area (S4), the recorded signal is reproduced to detect and store the amplitude level of the reproduced signal (S5).

By repeating the steps S4 to S6 with stepwise increases of the recording power to a predetermined recording power level, there can be determined the relationship between the recording power and the amplitude of the reproduced signal, similar to that shown in FIG. 7. The predetermined recording power can be, for example, twice the PH with which recording is effected on the control track of the magnetooptical disk.

The above-mentioned PHth immediately before the formation of the high-temperature level state varies according to the temperature, depending on the characteristics of the medium. The present invention is based on this property and effects detection of PHth immediately before the formation of the high-temperature level state and determination of PL, PH1 and PH2 based thereon, thereby setting the recording power corresponding to the temperature variation. The CPU 18 determines PHth from the data of the recording power and the reproduced signal amplitude stored in the memory and stores PHth in the memory (S7). In this manner the step (1) for determining PHth is completed. The present embodiment employs (1–7) codes for the modulation of the recording information, and the longest bit 8 T in this code system is used for the detection of the reproduced signal amplitude.

In the following there will be explained the step (2) for determining the laser power level PH1 for forming the high-temperature level state, again referring to FIG. 25. At first the CPU 18 calculates the laser power level PL for forming the low-temperature level state, utilizing the previously determined PHth, according to an equation PL=α× PHth (S8), wherein a coefficient a is defined by PLmin/ PHth<α<1.0. In this manner the value PL is determined.

Then the CPU 18 sets the initial value of the laser power level PH1 for forming the high-temperature level state as PH1=PHth (S9), and records an 8 T-continuous/2 T-continuous pattern in the write test area of the magnetooptical disk 1 under a condition PH1=PH2 (S10). Thus the recording conditions in this state are PL=α×PHth and PH1=PH2 =PHth, wherein PL is the value obtained previously. As explained in the foregoing, 8 T and 2 T are respectively the longest and shortest bits in the (1–7) code system.

After the recording of the 8 T-continuous/2 T-continuous pattern, the CPU instructs the device to reproduce this pattern by controlling various units and detects the slice level SL(8 T) of the reproduced signal of the 8 T pattern and the SL(2 T) of the reproduced signal of the 2 T pattern (S11). More specifically, the asymmetry detection circuit 19 detects the middle values of the peak and bottom values of the reproduced signals of the 8 T continuous pattern and the 2 T continuous pattern, then detects the difference ΔSL between the slice level SL(8 T) of the reproduced signal of the 8 T continuous pattern and the SL(2 T) of the reproduced signal of the 2 T continuous pattern (S12), and the CPU 18 stores thus obtained ΔSL in the internal memory (S13).

Figure 27:
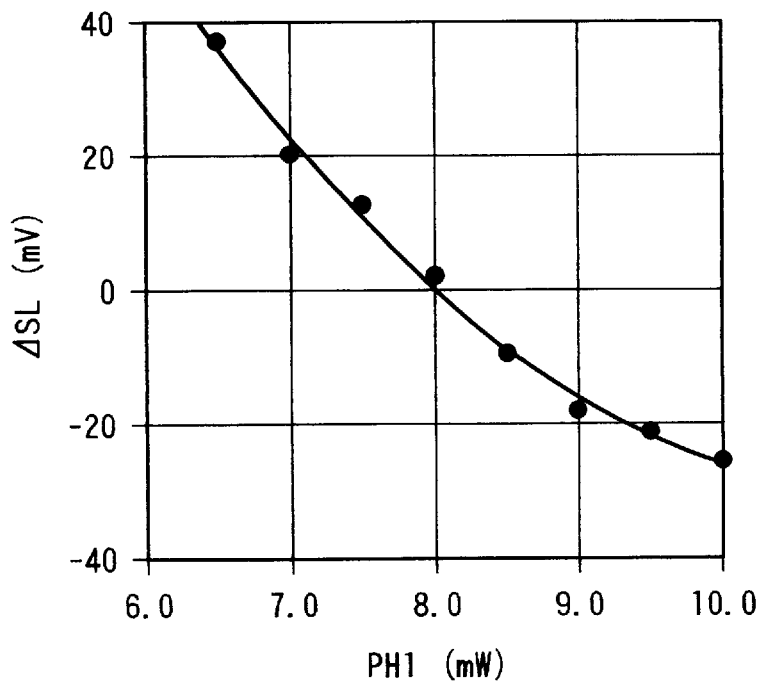
FIG. 27 is a chart showing the relationship between a power level PH1 for forming the high-temperature level state and a difference $\Delta SL$ in the middle value of the peak and the bottom in the amplitude between the 2 T and 8 T reproduced signals.

After the determination of ΔSL, the CPU 18 adds ΔPH1 to PH1 (S14) and instructs the device to effect recording of an 8 T-continuous/2 T-continuous pattern in the write test area again with the thus renewed recording power (S10), reproduction of the thus recorded pattern and detection of the slice levels of the 2 T and 8 T continuous patterns (S11), detection of the difference ΔSL thereof (S12) and storage of the difference in the memory (S13). In this manner, the CPU 18 instructs the device to repeat the steps S10 to S14 with a stepwise increase of PH1 by ΔPH1, with detection of the difference ΔSL between the slice level SL(8 T) of the reproduced signal of the 8 T continuous pattern and the SL(2 T) of the reproduced signal of the 2 T continuous pattern each time, until PH1 reaches a predetermined value. FIG. 27 shows the thus obtained relationship between PH1 and ΔSL, wherein the optimum value PHopt is given by the value of PH1 when SL(8 T) SL(2 T) becomes zero. FIG. 27 shows actual data, obtained by recording the 2 T/8 T continuous pattern for different values of PH1 and measuring the resulting ΔSL. In the data shown in FIG. 27, ΔSL became zero when PH1 was 8 mW, so that PH1opt was determined as 8 mW.

Figure 28A:
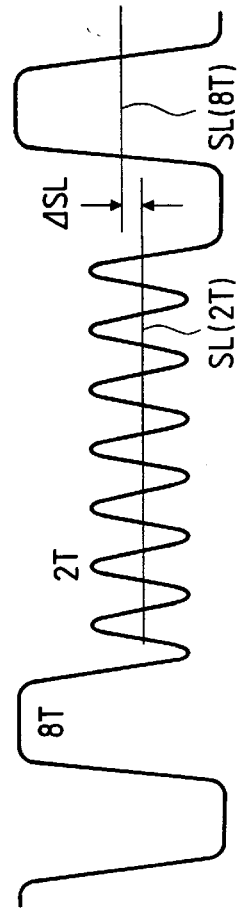
FIGS. 28 to 28C are wave form charts showing reproduced signals of an 8 T-continuous/2 T-continuous pattern for different PH1 values.
Figure 28B:
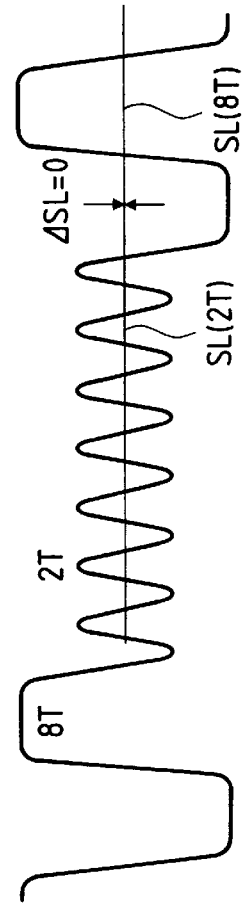
Figure 28C:
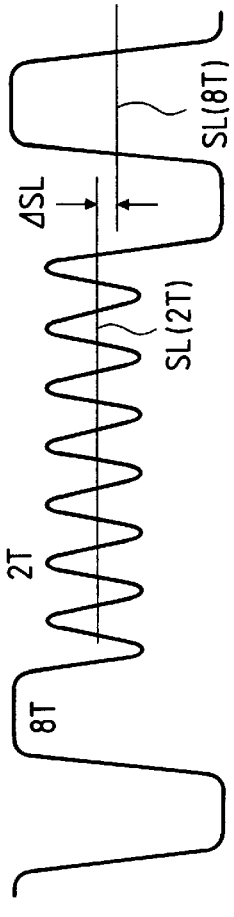

As explained in the foregoing, the present embodiment employs the (1–7) code system and detects the difference ΔSL between the slice levels (middle values between the peak and bottom values) of the two reproduced signals of the longest 8 T and shortest 2 T bits. FIGS. 28A to 28C illustrate the reproduced signals of the 8 T-continuous/2 T-continuous pattern for different values of PH1. FIG. 28A shows a reproduced signal wave form in case PH1 is lower than the optimum value, wherein the 2 T continuous pattern assumes a level lower than that of the 8 T continuous pattern. In this case, therefore, there is generated a difference ΔSL between the slice levels of the two patterns, as shown in FIG. 28A. In contrast, FIG. 28B shows a reproduced signal wave form in case PH1 is at the optimum level, wherein slice levels of the two patterns are mutually equal. FIG. 28C shows a reproduced signal wave form in case PH1 is higher than the optimum level, wherein the 2 T continuous pattern assumes a higher level than that of the 8 T continuous pattern. Consequently, in this case, there is generated a difference ΔSL between the slice levels of the two patterns, as shown in FIG. 28C.

As shown in FIGS. 28A to 28C, the reproduced signal of the longest 8 T bit is in the saturated state, and, in this state, the middle value of the peak and bottom values, or the slice level, of the 8 T reproduced signal can be regarded as 0. In the present embodiment, therefore, there is detected PH1 when ΔSL becomes zero, by varying the value of PH1, so as to record the 2 T pattern with an exact length, taking the 8 T pattern as a reference. Stated differently, since the slice level of the 8 T reproduced signal can be regarded as 0, that of the 2 T reproduced signal can also be regarded as 0 if the difference ΔSL between the slice levels of the 8 T and 2 T reproduced signals is 0. This fact means that the 2 T bit can be recorded with an exact length, so that the PH1 value in this state can be obtained as the optimum power level for exactly recording the shortest 2 T bit.

Finally there will be explained the step (3) for determining the other laser power level PH2 for forming the high-temperature level state, with reference to FIG. 26, of which the step S15 follows the step S13 in FIG. 25. At first, based on the previously obtained results, the CPU 18 instructs the device to set PH1 at PH1opt, and also to set the initial value of PH2 as 0.8×PH1opt (S15). Then the CPU 18 instructs the device to record an 8 T continuous pattern in the write test area of the magnetooptical disk 1 under the recording conditions of PL=α×PHth, PH1=PH1opt and PH2=0.8× PH1opt.

Then the CPU 18 instructs the device to reproduce, by controlling various units, the 8 T continuous pattern recorded in the write test area (S17). The differentiating circuit 21 differentiates the obtained reproduced signal (S17), and the differential signal amplitude detection circuit 22 detects the positive amplitude (d/dt(LE)) and the negative amplitude (d/dt(TE)) of the differential signal of the 8 T continuous pattern (S18). In this manner, the differential signal amplitude detection circuit 22 detects the slopes of the front and rear edges of the differential signal of the 8 T continuous pattern. The obtained amplitude values are fetched in the CPU 18 through the A/D converter. The differentiation of the reproduced signal is to detect the level of inclination thereof, as will be explained later.

Then the CPU 18 discriminates whether the difference between the positive amplitude (d/dt(LE)) and the negative amplitude (d/dt(TE)) of the differential signal of the 8 T continuous pattern, obtained in the differential signal amplitude detection circuit 22 (S19), is zero, and, if not, stores the obtained difference in a memory. Then, the CPU 18 adds ΔPH2 to PH2 and again instructs the device to effect recording of the 8 T continuous pattern in the write test area (S16), reproduction and differentiation of the 8 T continuous pattern (S17), detection of the positive and negative amplitudes of the differential signal (S18) and discrimination of whether the difference thereof is zero (S19). In this manner, the CPU 18 instructs the device to repeat the steps S16 to S19 with a stepwise increase of PH2 by ΔPH2, with discrimination each time of whether the difference between the positive amplitude (d/dt(LE)) and the negative amplitude (d/dt(TE)) of the differential signal of the 8 T continuous pattern is zero. Then, when the step S19 identifies d/dt/(LE) −d/dt(TE)=0, the value of PH2 in this state is determined as the optimum value PH2opt (S21).

Figure 29:
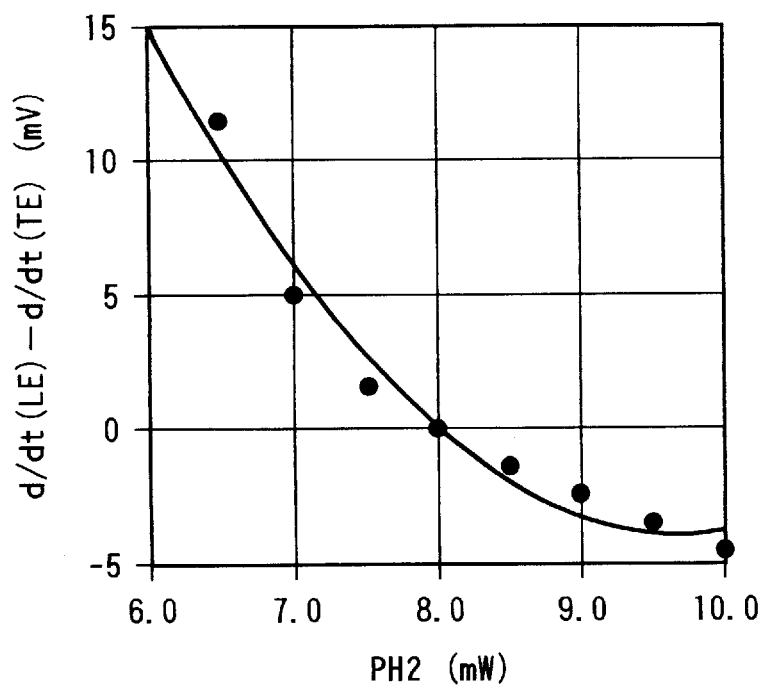
FIG. 29 is a chart showing the relationship between the power level PH2 for forming the high-temperature level state and the difference between the positive and negative amplitudes in the 2 T–8 T differentiated reproduced signal.

FIG. 29 shows the change of the difference between the positive and negative amplitudes of the differential signal of the 8 T continuous pattern, as a function of PH2. FIG. 29 shows actual data obtained by recording the 8 T continuous pattern with different values of PH2 and measuring the difference between the positive and negative amplitudes of the reproduced and differentiated signal. In the example shown in FIG. 29, the difference in the amplitudes became 0 when PH2=8.0 mW, so that the optimum power of PH2 was determined as 8.0 mW. In this manner, the optimum values of PL, PH1 and PH2 are determined (S22) and the write test is completed. Thus multi-level recording powers of the semiconductor laser 5 are respectively set at the optimum values obtained in the write test, and the information recording is thereafter conducted with such optimum recording powers.

Figure 30A:
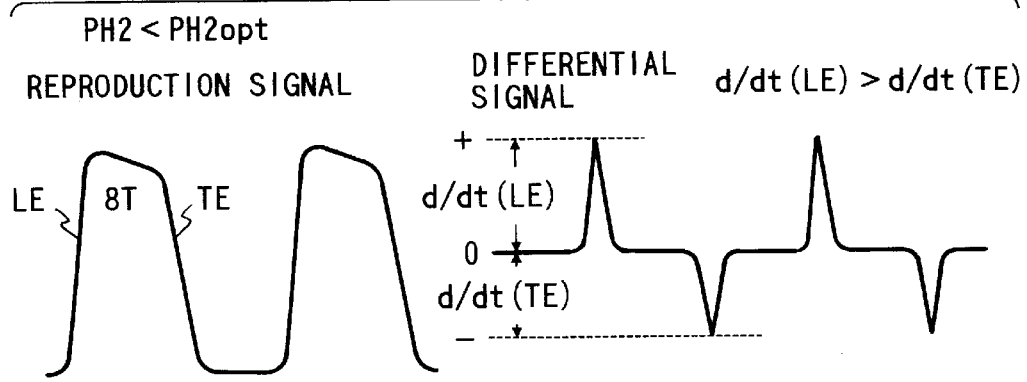
FIGS. 30A to 30 are wave form charts showing reproduced signals of the 8 T continuous pattern and corresponding differential signals for different PH2 values.
Figure 30B:
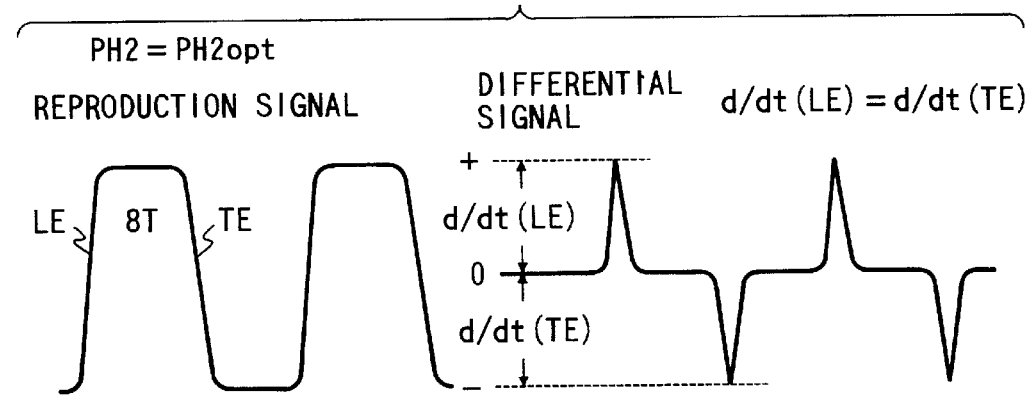
Figure 30C:
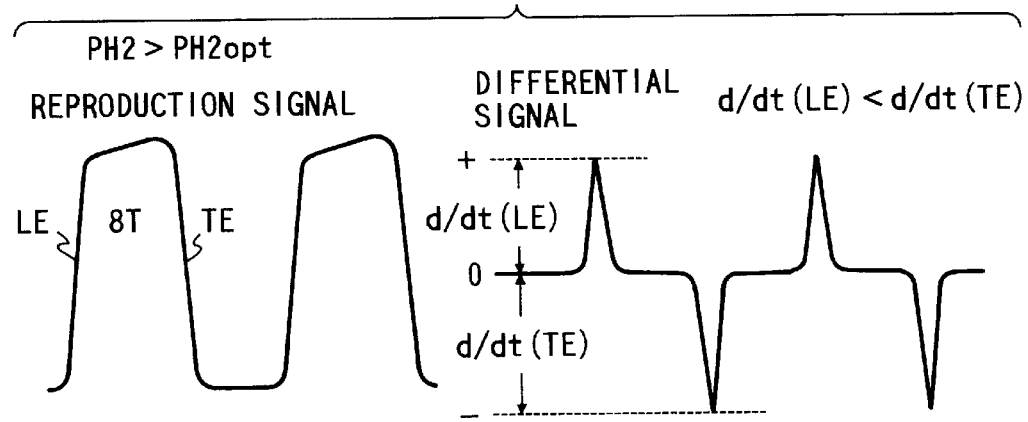

In the present embodiment, as explained in the foregoing, there are detected the amplitudes of the positive and negative sides of the reproduced and differentiated signal of the longest bit (8 T), and the optimum value of PH2 is determined according thereto. FIGS. 30A to 30C illustrate reproduced signals of the 8 T continuous pattern and corresponding differential signals, for different values of PH2. At first, FIG. 30A shows a signal wave form when the PH2 is lower than the optimum value, wherein the reproduced signal of the 8 T continuous pattern declines toward the right-hand side. Thus the trailing edge (TE) is less steep than the leading edge (LE), indicating that an ideally oval bit is formed. In fact, in this case, there is formed a bit of an inverse tear-drop shape. By differentiating this reproduced signal of the 8 T continuous pattern, there is obtained a differential wave form as shown in FIG. 30A, in which the positive amplitude d/dt(LE) is larger than the negative amplitude d/dt(TE).

FIG. 30B shows a signal wave form when PH2 is equal to the optimum value, wherein the reproduced signal of the 8 T continuous pattern is symmetrical in the positive and negative sides. In this case the leading edge LE and the trailing edge TE have the same slope, indicating the formation of an ideally oval bit. By differentiating the reproduced signal of the 8 T continuous pattern, there is obtained a differential wave form shown in FIG. 30B, wherein the positive amplitude d/dt(LE) is equal to the negative amplitude d/dt(TE). FIG. 30C shows a signal wave form when PH2 is higher than the optimum value, wherein the reproduced signal of the 8 T continuous pattern assumes a right-upward profile. In such a case, the trailing edge TE is steeper than the leading edge LE, indicating that an ideal oval bit is not formed. In fact there is formed a tear-drop shaped bit in this case. By differentiating such a reproduced signal of the 8 T continuous pattern, there is obtained a differential wave form as shown in FIG. 30C, in which the positive amplitude d/dt(LE) is smaller than the negative amplitude d/dt(TE).

As explained in the foregoing, the slopes of the leading and trailing edges of the reproduced signal are correlated with the shape of the bit and allow one to estimate whether the bit is recorded in the ideal state. Consequently, in the present embodiment, the recording operation is conducted with different values of PH2 for recording the 8 T continuous pattern in an ideal bit shape, and there is detected the recording power PH2opt where the slopes of the leading and trailing edges of the reproduced signal become mutually equal. Stated differently, the optimum value PH2opt is determined by detecting the recording power where the positive amplitude d/dt(LE) and the negative amplitude d/dt(TE) of the reproduced and differentiated signal of the 8 T continuous pattern become mutually equal.

The present inventors have conducted the following experiment for confirming whether the PH1 and PH2, obtained in the write test explained above, are in fact the optimum recording powers. Random (1–7)-modulated signals of maximum frequency of 9.83 MHz were recorded on the magnetooptical disk 1 with a linear velocity of 12.56 m/s (revolution 3000 rpm and radial recording position 40.0 mm) with different values of PH1 and PH2, and jitter was measured at the upshift and downshift edges of the reproduced signal. PHth was 6.0 mW, and PL was set at 5.4 mW, with α=0.9. The larger one of the jitters on both edges was picked and plotted to provide the results shown in FIG. 31, which is a map representing the level of jitter as functions of PH1 and PH2, respectively represented in the abscissa and in the ordinate.

Figure 31:
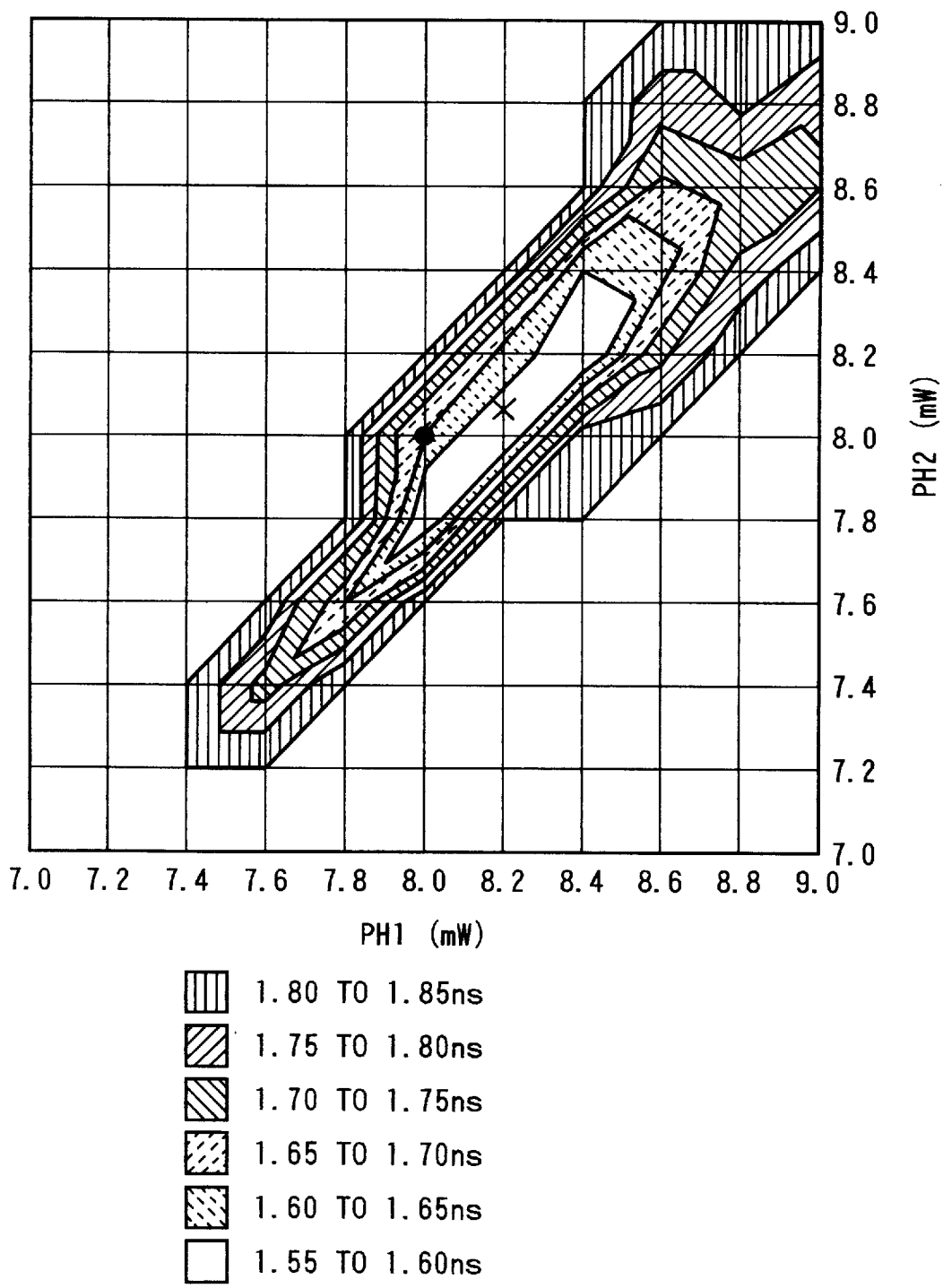
FIG. 31 is a chart showing the result of confirmation of PH1 and PH2.

In FIG. 31, the jitter of the reproduced signal is classified into six levels, with a best level in a range of 1.50 to 1.60 ns and a worst level in a range of 1.80 to 1.85 ns. The plotting of jitter as functions of PH1 and PH2 in the form of FIG. 31 allows the evaluation of PH1 and PH2 by the level of the jitter. More specifically, in FIG. 31, the jitter is smallest in the center of the contour lines and becomes larger at the outer contours. Consequently, in FIG. 31, a position marked with x at the center of contours indicates the recording conditions with the smallest jitter, corresponding to 8.2 mW for PH1 and 8.05 for PH2.

On the other hand, a position marked with a black circle indicates PH1 and PH2 obtained by the above-explained write test. As shown in FIG. 27, PH1 is 8.0 mW when ΔSL becomes zero, and, as shown in FIG. 29, PH2 is 8.0 mW when the positive and negative amplitudes of the differential signal become mutually equal, whereby the black circled position in FIG. 31 is derived. As shown in FIG. 31, the position of mark x, representing the experimentally confirmed optimum conditions of PH1 and PH2 providing the smallest jitter, substantially coincides with the position of the black circle, representing the optimum recording conditions obtained according to the present invention. This fact indicates that the write test method of the present invention allows exact recording of the bits with minimized jitter in the reproduced signal, thus confirming that the recording powers in the multi-level control are appropriately adjusted.

The recording power need not be varied if the linear velocity of the disk 1 is constant regardless of the recording position, but it has to be adjusted if the linear velocity of the disk 1 varies depending on the radial recording position, as in the case of a CAV process. As shown in FIG. 9, a substantially linear relationship stands between the linear velocity and the recording power. Consequently, in such case, the write test explained in FIGS. 25 and 26 is to be conducted, for example in the inner, intermediate and outer positions of the disk 1, and the values of PL, PH1 and PH2 obtained in respective positions are stored in a memory and are used to vary the values of PL, PH1 and PH2 by linear approximation, depending on the radial position on the disk 1. Also in the foregoing explanation, it is assumed that the write test is conducted at each exchange of the disk 1, but it may also be conducted prior to each information recording, or periodically at a predetermined interval even after the disk 1 is loaded.

Also in the foregoing embodiment, the laser is assumed to be turned on with the wave form shown in FIG. 23, but the present invention is not limited to such a wave form and may employ a turn-on wave form as shown in FIG. 12A, 12B or 12C.

Also in the foregoing embodiment, the PHth immediately before the formation of the high-temperature level state is determined by recording an 8 T continuous pattern and finding a recording power where the amplitude of the reproduced signal starts to increase, but the mark portion of the 8 T continuous signal in the test pattern may also be recorded by pulsed turn-on of a length of T/2. In such case the PL level is determined from PHth by an equation PL=×PHth, wherein β<1.0.

Also in the foregoing embodiment there has been explained a write test controlled by four values PL, PH1, PH2 and Pr, but the present invention is not limited to such case and is applicable also, for example, to a case controlled by three values PL, PH and Pr (=Pb). In such three-value controlled case, the write test is conducted in the following manner. At first steps S1 to S8 in FIG. 25 are executed in the same manner as in the three-value control to detect PHth, according to which PL is set. Then, since the high-temperature level state (for recording) in the three-value control is solely determined by the power level PH, the step S9 in FIG. 25 sets PH–PHth, and the step S10 records the 8 T-continuous/2 T-continuous pattern with thus set power level PH.

Subsequently the step S11 reproduces the recorded pattern and detects the slice levels of the 8 T and 2 T reproduced signals, then the step S12 detects the difference ΔSL of the slice levels of the 8 T and 2 T signals, and the step S13 stores the obtained ΔSL in the memory. The steps S10 to S13 are repeated with a stepwise increase of PH1 by ΔPH1 until a value of PH reaches a desired one, with detection, each time, of the difference ΔSL between the slice level SL(8 T) of the reproduced signal of the 8 T continuous pattern and the SL(2 T) of the reproduced signal of the 2 T continuous pattern, whereby data as shown in FIG. 27 can be obtained. Based on these data, the optimum power level PHopt can be determined when SL(8 T) SL(2 T) becomes zero. In this manner the optimum values of PL and PH are determined, and the write test for three-value control is completed. In this manner, the present invention is applicable also to the write test for three-value control. Also the foregoing embodiment has been explained with the (1–7) code system, but the present invention is naturally applicable to other modulation systems.

What is claimed is:

1. A write test method for use in a recording process for recording information by modulating the power of a laser light thereby forming a high-temperature state and a low-temperature state on a recording medium, comprising:

a step of recording a predetermined signal on the medium;

a first step of reproducing the recorded information;

steps of repeating the recording step with a variation in the power level of the laser light and repeating said first reproducing step;

a step of detecting the power level of the laser light which occurs immediately before the formation of the high-temperature state, based on amplitudes of reproduced signals obtained in said first reproducing step; and a step of determining the power level of the laser light for forming the low-temperature state and the power level of the laser light for forming the high-temperature state, based on the detected power level, wherein said determining step includes:

a step of recording record marks of different sizes on the medium, with a variation of the power level of the laser light, taking the detected power level as a reference;

a second step of reproducing the recorded information; and a step of detecting middle values of the peak and bottom values of the reproduced signals, obtained in said second reproducing step and corresponding to the record marks, and detecting the difference between the middle values, wherein the power level of said laser light for forming the high-temperature state is determined according to said difference.

2. A write test method according to claim 1, wherein the power level of the laser light for forming said low-temperature state is determined by multiplying said detected power level with a predetermined coefficient.

3. A method according to claim 1, wherein said recording step performs an optical modulation overwriting process, and when a power level of the laser light for formation of the low-temperature state is PL and power levels of the laser light for formation of the high-temperature state are PH1 and PH2, in order to set the power levels PL, PH1, and PH2 of the laser light, wherein said determining step further includes the steps of:

determining the recording power level PL by multiplying the detected power level by a predetermined constant;

obtaining a ratio of the recording power level PH1 and the recording power level PH2; and recording recording marks having different lengths with a variation of the recording power levels PH1 and PH2 while keeping the ratio constant, and reproducing the respective recording marks, detecting a middle value between a peak value and a bottom value of the reproduction signals corresponding to each of the recording marks, detecting a difference between the middle values, and determining the recording power levels PH1 and PH2 at which the difference becomes substantially zero.

4. A method according to claim 3, wherein said step for obtaining the ratio of said recording power levels PH1 and PH2 includes the steps of:

recording recording marks having different lengths with a variation of the recording power level PH1 while fixing the recording power level PH2, reproducing the respective recording marks, detecting a middle value between a peak value and a bottom value of the reproduction signals corresponding to each of the recording marks, detecting a difference between the middle values, determining the recording power level PH1 at which the difference becomes substantially zero, and storing the recording power level PH1;

recording recording marks having different lengths with a variation of the recording power level PH2 while fixing the power level PH1 to the stored value, reproducing the respective recording marks, detecting a middle value between a peak value and a bottom value of the reproduction signals corresponding to each of the recording marks, detecting a difference between the middle values, and determining the recording power level PH2 at which the difference becomes substantially zero; and calculating the ratio of the recording power level PH1 and the recording power level PH2 on the basis of the stored recording power level PH1 and the determined recording power level PH2.

5. A method according to claim 3, wherein said step for obtaining the ratio of said recording power levels PH1 and PH2 includes the steps of:

recording recording marks having different lengths with a variation of the recording power level PH1 while fixing the recording power level PH2, reproducing the respective recording marks, detecting a middle value between a peak value and a bottom value of the reproduction signals corresponding to each of the recording marks, detecting a difference between the middle values, determining the recording power level PH1 at which the difference becomes substantially zero, and storing the recording power level PH1;

recording recording marks having different lengths with a variation of the recording power levels PH1 and PH2 while taking the determined recording power level PH1 as a reference and keeping the ratio of the recording power level PH1 and PH2 constant, reproducing the respective recording marks, detecting an amplitude value of the reproduction signal corresponding to each of the recording marks, and detecting a difference between the amplitude values, and determining the recording power level PH2 at which the difference first occurs; and calculating the ratio of the recording power levels PH1 and PH2 on the basis of the stored recording power level PH1 and the determined recording power level PH2.

6. A method according to claim 1, wherein said determining step is performed at plural positions on the recording medium.

* * * * *

UNITED STATES PATENT AND TRADEMARK OFFICE
CERTIFICATE OF CORRECTION

PATENT NO. : 5,815,477

DATED : September 29, 1998

INVENTOR(S): SHUNPEI KIMURA, ET AL.

Page 1 of 2

It is certified that error appears in the above-identified patent and that said Letters Patent is hereby corrected as shown below:

<u>COVER PAGE, AT [57] ABSTRACT</u>,
Line 2, "by such" should read --such--.

<u>COLUMN 1</u>,
Line 63, "bean" should read --beam--.

<u>COLUMN 7</u>,
Line 16, "a" should read --$\alpha$--.

<u>COLUMN 11</u>,
Line 40, "same" should read --the same--.

<u>COLUMN 12</u>,
Line 63, "(PH1-PL)x(1-exp$^{-Th2/\gamma}$)" should read
--(PH1-PL)x(1-exp$^{-Th1/\tau}$)--; "(1-exp$^{-Tp/\gamma}$)" should read
--(1-exp$^{-Tp/\tau}$)--; and "(1-e$^{-Th2/\gamma}$)" should read --(1-e$^{-Th2/\tau}$)--.

<u>COLUMN 15</u>,
Line 48, "($\gamma$=42,37 ns)" should read --(T=42,37ns)--.

<u>COLUMN 19</u>,
Line 16, "a" should read --$\alpha$--. (second occurrence)

UNITED STATES PATENT AND TRADEMARK OFFICE
CERTIFICATE OF CORRECTION

PATENT NO. : 5,815,477

DATED : September 29, 1998

INVENTOR(S) : SHUNPEI KIMURA, ET AL.

It is certified that error appears in the above-identified patent and that said Letters Patent is hereby corrected as shown below:

<u>COLUMN 23</u>,
Line 16, "PL=XPHth," should read --PL=$\beta$ x PHth,--.
Line 43, "SL(8 T)SL(2 T)" should read --SL(8T)-SL(2T)--.

Signed and Sealed this

Thirty-first Day of August, 1999

Attest:

Q. TODD DICKINSON

*Attesting Officer*     *Acting Commissioner of Patents and Trademarks*